United States Patent
Omer

(10) Patent No.: US 10,952,181 B1
(45) Date of Patent: Mar. 16, 2021

(54) DETECTING A LOCATION OF MOTION USING WIRELESS SIGNALS IN A WIRELESS MESH NETWORK THAT INCLUDES LEAF NODES

(71) Applicant: Cognitive Systems Corp., Waterloo (CA)

(72) Inventor: Mohammad Omer, Waterloo (CA)

(73) Assignee: Cognitive Systems Corp., Waterloo (CA)

( * ) Notice: Subject to any disclaimer, the term of this patent is extended or adjusted under 35 U.S.C. 154(b) by 0 days.

(21) Appl. No.: 16/867,089

(22) Filed: May 5, 2020

Related U.S. Application Data

(60) Provisional application No. 62/908,401, filed on Sep. 30, 2019.

(51) Int. Cl.
*H04W 64/00* (2009.01)
*H04W 4/38* (2018.01)
(Continued)

(52) U.S. Cl.
CPC ......... *H04W 64/006* (2013.01); *H04W 4/025* (2013.01); *H04W 4/029* (2018.02); *H04W 4/38* (2018.02); *H04W 84/18* (2013.01)

(58) Field of Classification Search
CPC ....... H04W 4/025; H04W 4/029; H04W 4/38; H04W 64/006; H04W 84/18; G01S 5/02; G01S 5/10

See application file for complete search history.

(56) References Cited

U.S. PATENT DOCUMENTS

| 4,054,879 A | 10/1977 | Wright et al. |
| 4,636,774 A | 1/1987 | Galvin et al. |

(Continued)

FOREIGN PATENT DOCUMENTS

| CA | 2834522 | 5/2014 |
| CA | 2945702 | 8/2015 |

(Continued)

OTHER PUBLICATIONS

Dekker, et al., "Gesture Recognition with a Low Power FMCW Radar and a Deep Convolutional Neural Network", Proceedings of the 14th European Radar Conference, Nuremberg, Germany, Oct. 11-13, 2017, 4 pgs.

(Continued)

*Primary Examiner* — Khoa Huynh
(74) *Attorney, Agent, or Firm* — Henry Patent Law Firm PLLC

(57) ABSTRACT

In a general aspect, a method is presented for detecting a location of motion using wireless signals in a wireless mesh network that includes leaf nodes. The method includes obtaining motion-sensing data based on wireless signals exchanged on wireless links in a wireless mesh network including a plurality of nodes. The plurality of nodes includes a first access point (AP) node, one or more other AP nodes, and leaf nodes. The method also includes identifying, based on the motion-sensing data, the first AP node as an estimated location of motion of an object. The method additionally includes generating a likelihood data structure comprising likelihood values assigned to respective nodes of the plurality of nodes in response to the first AP node being identified as the estimated location of motion. A location of the motion of the object is determined based on the likelihood data structure.

24 Claims, 20 Drawing Sheets

(51) Int. Cl.
*H04W 4/029* (2018.01)
*H04W 4/02* (2018.01)
*H04W 84/18* (2009.01)

(56) References Cited

U.S. PATENT DOCUMENTS

| | | |
|---|---|---|
| 4,649,388 A | 3/1987 | Atlas |
| 4,740,045 A | 4/1988 | Goodson et al. |
| 5,270,720 A | 12/1993 | Stove |
| 5,613,039 A | 3/1997 | Wang et al. |
| 5,696,514 A | 12/1997 | Nathanson et al. |
| 6,075,797 A | 6/2000 | Thomas |
| 6,380,882 B1 | 4/2002 | Hegnauer |
| 6,573,861 B1 | 6/2003 | Hommel et al. |
| 6,636,763 B1 | 10/2003 | Junker et al. |
| 6,914,854 B1 | 7/2005 | Heberley et al. |
| 7,652,617 B2 | 1/2010 | Kurtz et al. |
| 8,463,191 B2 | 6/2013 | Farajidana et al. |
| 8,660,578 B1 | 2/2014 | Yang et al. |
| 8,671,069 B2 | 3/2014 | Chang et al. |
| 8,710,984 B2 | 4/2014 | Wilson et al. |
| 8,812,654 B2 | 8/2014 | Gelvin et al. |
| 8,832,244 B2 | 9/2014 | Gelvin et al. |
| 8,836,344 B2 | 9/2014 | Habib et al. |
| 8,836,503 B2 | 9/2014 | Gelvin et al. |
| 9,019,148 B1 | 4/2015 | Bikhazi et al. |
| 9,030,321 B2 | 5/2015 | Breed |
| 9,244,152 B1 * | 1/2016 | Thiagarajan ............... G01S 5/10 |
| 9,253,592 B1 | 2/2016 | Moscovich et al. |
| 9,329,701 B2 | 5/2016 | Lautner |
| 9,523,760 B1 | 12/2016 | Kravets et al. |
| 9,524,628 B1 | 12/2016 | Omer et al. |
| 9,551,784 B2 | 1/2017 | Katuri et al. |
| 9,584,974 B1 | 2/2017 | Omer et al. |
| 9,609,468 B1 | 3/2017 | Moscovich et al. |
| 9,628,365 B2 | 4/2017 | Gelvin et al. |
| 9,692,459 B2 | 6/2017 | Maltsev et al. |
| 9,743,294 B1 | 8/2017 | Omer et al. |
| 9,866,308 B1 | 1/2018 | Bultan et al. |
| 9,869,759 B2 | 1/2018 | Furuskog et al. |
| 9,927,519 B1 | 3/2018 | Omer et al. |
| 9,933,517 B1 | 4/2018 | Olekas et al. |
| 9,946,351 B2 | 4/2018 | Sakaguchi et al. |
| 9,989,622 B1 | 6/2018 | Griesdorf et al. |
| 10,004,076 B1 | 6/2018 | Griesdorf et al. |
| 10,048,350 B1 | 8/2018 | Piao et al. |
| 10,051,414 B1 | 8/2018 | Omer et al. |
| 10,077,204 B2 | 9/2018 | Maschmeyer et al. |
| 10,108,903 B1 | 10/2018 | Piao et al. |
| 10,109,167 B1 | 10/2018 | Olekas et al. |
| 10,109,168 B1 | 10/2018 | Devison et al. |
| 10,111,228 B2 | 10/2018 | Griesdorf et al. |
| 10,129,853 B2 | 11/2018 | Manku et al. |
| 10,228,439 B1 | 3/2019 | Olekas et al. |
| 10,264,405 B1 | 4/2019 | Manku et al. |
| 10,318,890 B1 | 6/2019 | Kravets et al. |
| 10,380,856 B2 | 8/2019 | Devison et al. |
| 10,393,866 B1 | 8/2019 | Kravets et al. |
| 10,404,387 B1 | 9/2019 | Devison et al. |
| 10,438,468 B2 | 10/2019 | Olekas et al. |
| 10,459,074 B1 | 10/2019 | Omer et al. |
| 10,459,076 B2 | 10/2019 | Kravets et al. |
| 10,460,581 B1 | 10/2019 | Devison et al. |
| 10,498,467 B1 | 12/2019 | Ravkine |
| 10,499,364 B1 | 12/2019 | Ravkine |
| 10,506,384 B1 | 12/2019 | Omer et al. |
| 10,565,860 B1 | 2/2020 | Omer et al. |
| 10,567,914 B1 | 2/2020 | Omer et al. |
| 10,600,314 B1 | 3/2020 | Manku et al. |
| 10,605,907 B2 | 3/2020 | Kravets et al. |
| 10,605,908 B2 | 3/2020 | Kravets et al. |
| 2002/0080014 A1 | 6/2002 | McCarthy et al. |
| 2003/0108119 A1 | 6/2003 | Mohebbi et al. |
| 2005/0128067 A1 | 6/2005 | Zakrewski |
| 2006/0152404 A1 | 7/2006 | Fullerton et al. |
| 2006/0217132 A1 | 9/2006 | Drummond-Murray et al. |
| 2006/0284757 A1 | 12/2006 | Zemany |
| 2007/0296571 A1 | 12/2007 | Kolen |
| 2008/0057978 A1 | 3/2008 | Karaoguz et al. |
| 2008/0119130 A1 | 5/2008 | Sinha |
| 2008/0240008 A1 | 10/2008 | Backes et al. |
| 2008/0258907 A1 | 10/2008 | Kalpaxis |
| 2008/0300055 A1 | 12/2008 | Lutnick et al. |
| 2008/0303655 A1 | 12/2008 | Johnson |
| 2009/0062696 A1 | 3/2009 | Nathan et al. |
| 2009/0180444 A1 | 7/2009 | McManus et al. |
| 2010/0073686 A1 | 3/2010 | Medeiros et al. |
| 2010/0127853 A1 | 5/2010 | Hanson et al. |
| 2010/0130229 A1 | 5/2010 | Sridhara et al. |
| 2010/0207804 A1 | 8/2010 | Hayward et al. |
| 2010/0306320 A1 | 12/2010 | Leppanen et al. |
| 2010/0315284 A1 | 12/2010 | Trizna et al. |
| 2011/0019587 A1 | 1/2011 | Wang |
| 2011/0035491 A1 | 2/2011 | Gelvin et al. |
| 2011/0090081 A1 | 4/2011 | Khorashadi et al. |
| 2011/0260871 A1 * | 10/2011 | Karkowski ............ G08B 21/22 340/573.1 |
| 2011/0263946 A1 | 10/2011 | El Kaliouby et al. |
| 2012/0115512 A1 | 5/2012 | Grainger et al. |
| 2012/0146788 A1 | 6/2012 | Wilson et al. |
| 2012/0182429 A1 | 7/2012 | Forutanpour et al. |
| 2012/0184296 A1 | 7/2012 | Milosiu |
| 2012/0283896 A1 | 11/2012 | Persaud |
| 2013/0017836 A1 | 1/2013 | Chang et al. |
| 2013/0090151 A1 | 4/2013 | Ngai et al. |
| 2013/0094538 A1 | 4/2013 | Wang |
| 2013/0113647 A1 | 5/2013 | Sentelle et al. |
| 2013/0162459 A1 | 6/2013 | Aharony et al. |
| 2013/0178231 A1 | 7/2013 | Morgan |
| 2013/0283256 A1 | 10/2013 | Proud |
| 2013/0285855 A1 | 10/2013 | Dupray et al. |
| 2014/0126323 A1 | 5/2014 | Li et al. |
| 2014/0135042 A1 | 5/2014 | Buchheim et al. |
| 2014/0148195 A1 | 5/2014 | Bassan-Eskenazi et al. |
| 2014/0247179 A1 | 9/2014 | Furuskog |
| 2014/0266669 A1 | 9/2014 | Fadell et al. |
| 2014/0274218 A1 | 9/2014 | Kadiwala et al. |
| 2014/0286380 A1 | 9/2014 | Prager et al. |
| 2014/0329540 A1 | 11/2014 | Duggan et al. |
| 2014/0355713 A1 | 12/2014 | Bao et al. |
| 2014/0361920 A1 | 12/2014 | Katuri et al. |
| 2015/0043377 A1 | 2/2015 | Cholas et al. |
| 2015/0049701 A1 | 2/2015 | Tian et al. |
| 2015/0063323 A1 | 3/2015 | Sadek et al. |
| 2015/0078295 A1 | 3/2015 | Mandyam et al. |
| 2015/0098377 A1 | 4/2015 | Amini et al. |
| 2015/0159100 A1 | 6/2015 | Shi et al. |
| 2015/0181388 A1 | 6/2015 | Smith |
| 2015/0195100 A1 | 7/2015 | Imes et al. |
| 2015/0212205 A1 | 7/2015 | Shpater |
| 2015/0245164 A1 | 8/2015 | Merrill |
| 2015/0269825 A1 | 9/2015 | Tran |
| 2015/0288745 A1 | 10/2015 | Moghaddam et al. |
| 2015/0304886 A1 | 10/2015 | Liu et al. |
| 2015/0309166 A1 | 10/2015 | Sentelle et al. |
| 2015/0312877 A1 | 10/2015 | Bhanage |
| 2015/0338507 A1 | 11/2015 | Oh et al. |
| 2015/0350849 A1 | 12/2015 | Huang et al. |
| 2015/0366542 A1 | 12/2015 | Brown et al. |
| 2016/0018508 A1 | 1/2016 | Chen et al. |
| 2016/0088438 A1 | 3/2016 | O'Keeffe |
| 2016/0088631 A1 | 3/2016 | Hedayat et al. |
| 2016/0135205 A1 | 5/2016 | Barbu et al. |
| 2016/0150418 A1 | 5/2016 | Kang et al. |
| 2016/0183059 A1 | 6/2016 | Nagy et al. |
| 2016/0187475 A1 | 6/2016 | Horng et al. |
| 2016/0203689 A1 | 7/2016 | Hintz et al. |
| 2016/0210838 A1 | 7/2016 | Yan et al. |
| 2016/0217683 A1 | 7/2016 | Li |
| 2016/0262355 A1 | 9/2016 | Swan |
| 2016/0345286 A1 | 11/2016 | Jamieson et al. |
| 2016/0363663 A1 | 12/2016 | Mindell et al. |
| 2017/0042488 A1 | 2/2017 | Muhsin |
| 2017/0052247 A1 | 2/2017 | Kong et al. |

(56) References Cited

U.S. PATENT DOCUMENTS

| | | |
|---|---|---|
| 2017/0055126 A1 | 2/2017 | O'Keeffe |
| 2017/0055131 A1 | 2/2017 | Kong et al. |
| 2017/0059190 A1 | 3/2017 | Stefanski et al. |
| 2017/0086281 A1 | 3/2017 | Avrahamy |
| 2017/0090026 A1 | 3/2017 | Joshi et al. |
| 2017/0111852 A1 | 4/2017 | Selen et al. |
| 2017/0123528 A1 | 5/2017 | Hu et al. |
| 2017/0126488 A1 | 5/2017 | Cordeiro et al. |
| 2017/0146656 A1 | 5/2017 | Belsley et al. |
| 2017/0150255 A1 | 5/2017 | Wang et al. |
| 2017/0155439 A1 | 6/2017 | Chang et al. |
| 2017/0177618 A1 | 6/2017 | Hu et al. |
| 2017/0180882 A1 | 6/2017 | Lunner et al. |
| 2017/0195893 A1 | 7/2017 | Lee et al. |
| 2017/0223628 A1 | 8/2017 | Snyder et al. |
| 2017/0251392 A1 | 8/2017 | Nabetani |
| 2017/0278374 A1 | 9/2017 | Skaaksrud |
| 2017/0280351 A1 | 9/2017 | Skaaksrud |
| 2017/0311279 A1 | 10/2017 | Allegue Martinez et al. |
| 2017/0311574 A1 | 11/2017 | Swan |
| 2017/0343658 A1 | 11/2017 | Ramirez et al. |
| 2018/0027389 A1 | 1/2018 | Shirakata et al. |
| 2018/0086264 A1 | 3/2018 | Pedersen |
| 2018/0106885 A1 | 4/2018 | Blayvas |
| 2018/0120420 A1 | 5/2018 | McMahon et al. |
| 2018/0168552 A1 | 6/2018 | Sri et al. |
| 2018/0180706 A1 | 6/2018 | Li et al. |
| 2018/0184907 A1 | 7/2018 | Tran |
| 2018/0270821 A1 | 9/2018 | Griesdorf et al. |
| 2018/0288587 A1 | 10/2018 | Allegue Martinez et al. |
| 2018/0330293 A1 | 11/2018 | Kulkarni et al. |
| 2019/0033446 A1 | 1/2019 | Bultan et al. |
| 2019/0064315 A1 | 2/2019 | Ylamurto |
| 2019/0122514 A1 | 4/2019 | Olekas et al. |
| 2019/0146075 A1 | 5/2019 | Kravets et al. |
| 2019/0146076 A1 | 5/2019 | Kravets et al. |
| 2019/0146077 A1 | 5/2019 | Kravets et al. |
| 2019/0147713 A1 | 5/2019 | Devison et al. |
| 2019/0156943 A1 | 5/2019 | Kocherscheidt et al. |
| 2019/0272718 A1 | 9/2019 | Hurtig et al. |
| 2019/0294833 A1 | 9/2019 | Lu et al. |
| 2019/0327124 A1* | 10/2019 | Lai .................... H04L 27/362 |

FOREIGN PATENT DOCUMENTS

| | | |
|---|---|---|
| JP | 1997-507298 | 7/1997 |
| JP | 2004286567 | 10/2004 |
| JP | 2013072865 | 4/2013 |
| WO | 2014021574 | 2/2014 |
| WO | 2014201574 | 12/2014 |
| WO | 2015/168700 | 11/2015 |
| WO | 2016005977 | 1/2016 |
| WO | 2016066822 | 5/2016 |
| WO | 2016110844 | 7/2016 |
| WO | 2017106976 | 6/2017 |
| WO | 2017132765 | 8/2017 |
| WO | 2017177303 | 10/2017 |
| WO | 2017210770 | 12/2017 |
| WO | 2018094502 | 5/2018 |
| WO | 2019041019 | 3/2019 |

OTHER PUBLICATIONS

Domenico, et al., "Exploring Training Options for RF Sensing Using CSI", IEEE Communications Magazine, 2018, vol. 56, Issue 5, pp. 116-123, 8 pgs.

Iqbal, et al., "Indoor Motion Classification Using Passive RF Sensing Incorporating Deep Learning", ISSN: 2577-2465, Electronic IEEE, Jun. 3, 2018, 5 pgs.

Kosba, et al., "Robust WLAN Device-free Passive Motion Detection", IEEE Wireless Communications and Networking Conference, Apr. 2012, 6 pgs.

Youssef, Moustafa, et al., "Challenges: Device-free Passive Localization for Wireless Environments", Mobicom 07 Proceedings of the 13th Annual ACM International Conference on Mobile Computing and Networking, Sep. 2007, 11 pgs.

USPTO, Ex Parte Quayle Action mailed Jun. 19, 2020, in U.S. Appl. No. 16/867,064, 29 pgs.

USPTO, Non-Final Office Action dated Jun. 12, 2020, in U.S. Appl. No. 16/867,062, 32 pgs.

USPTO, Notice of Allowance dated Jul. 28, 2020, in U.S. Appl. No. 16/867,066, 37 pgs.

WIPO, International Search Report and Written Opinion dated Oct. 27, 2020, in PCT/CA2020/051080, 14 pgs.

Cai et al., "Human Movement Detection in Wi-Fi Mesh Networks," Technical Disclosure Commons, Dec. 17, 2017, 8 pgs.

* cited by examiner $$A_{N \text{ in nodes}} LLhood = \begin{cases} \dfrac{\# \text{ appearances in active links}}{\text{Connectivity of the node}} \times (1 - \alpha \times \text{sorted rank by motion magnitude}) & \text{...if } N \in \text{submesh} \\ \epsilon \text{ or } 0 \text{ if } N \text{ is not} \in \text{submesh} \end{cases}$$

DETECTING A LOCATION OF MOTION USING WIRELESS SIGNALS IN A WIRELESS MESH NETWORK THAT INCLUDES LEAF NODES

CROSS-REFERENCE TO RELATED APPLICATIONS

This application claims priority to U.S. Provisional Application No. 62/908,401 filed Sep. 30, 2019 and entitled "Detecting a Location of Motion Using Wireless Signals and Topologies of Wireless Connectivity." The priority application is hereby incorporated, in its entirety, by reference.

BACKGROUND

The following description relates to determining a location of motion detected from wireless signals based on wireless link counting.

Motion detection systems have been used to detect movement, for example, of objects in a room or an outdoor area. In some example motion detection systems, infrared or optical sensors are used to detect movement of objects in the sensor's field of view. Motion detection systems have been used in security systems, automated control systems and other types of systems.

DESCRIPTION OF DRAWINGS

FIG. 18 presents an example formula for determining a location of motion using a sub-mesh likelihood function.

DETAILED DESCRIPTION

Figure 1:
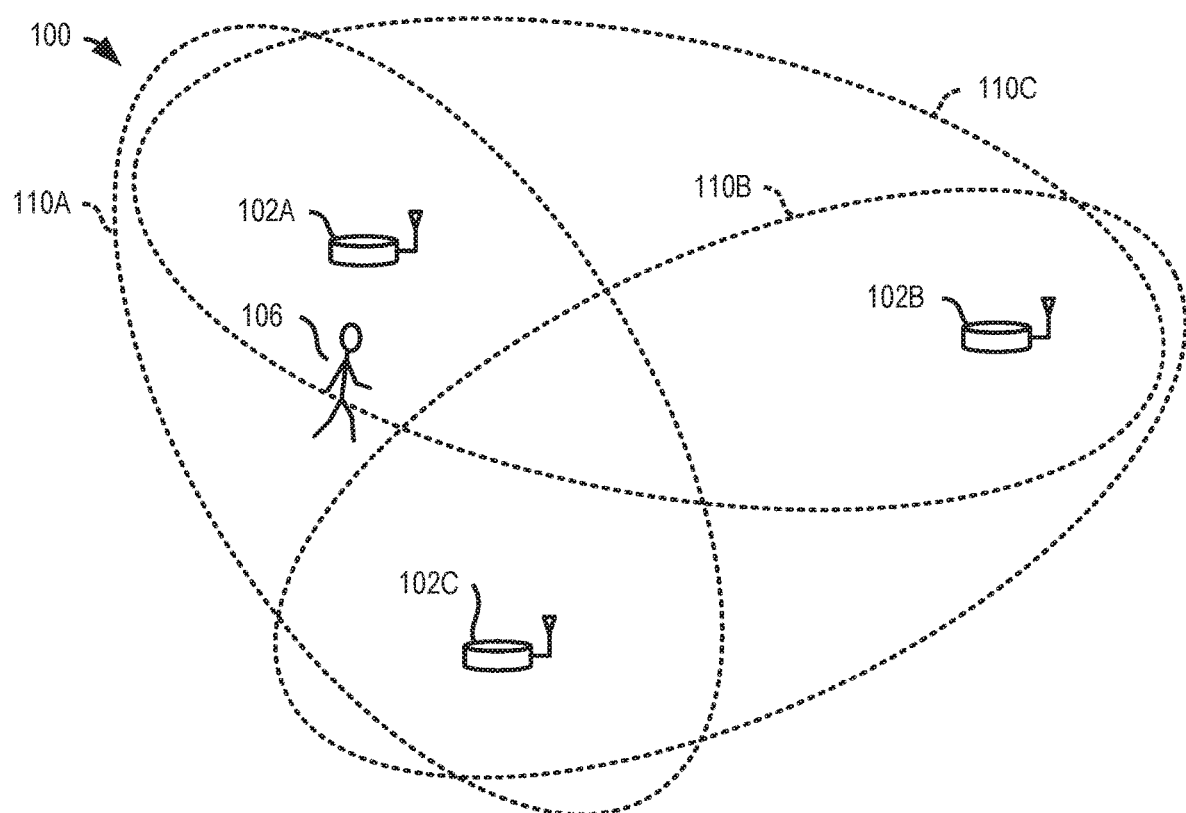
FIG. 1 is a diagram showing an example wireless communication system.

In some aspects of what is described here, the location of motion in a space (e.g., the particular room in a house where a person is moving, a particular floor or quadrant of a building where a person is moving, etc.) may be detected using information from multiple wireless communication devices communicating with each other wirelessly.

For instance, wireless signals received at each of the wireless communication devices in a wireless communication network may be analyzed to determine channel information for the different communication links in the network (between respective pairs of wireless communication devices in the network). The channel information may be representative of a physical medium that applies a transfer function to wireless signals that traverse the space. In some instances, the channel information includes channel response information. Channel response information may refer to known channel properties of a communication link, and may describe how a wireless signal propagates from a transmitter to a receiver, representing the combined effect of, for example, scattering, fading, and power decay within the space between the transmitter and receiver. In some instances, the channel information includes beamforming state information. Beamforming (or spatial filtering) may refer to a signal processing technique used in multi antenna (multiple-input/multiple-output (MIMO)) radio systems for directional signal transmission or reception. Beamforming can be achieved by combining elements in an antenna array in such a way that signals at particular angles experience constructive interference while others experience destructive interference. Beamforming can be used at both the transmitting and receiving ends in order to achieve spatial selectivity. In some cases (e.g., the IEEE 802.11ac standard), a beamforming steering matrix is used by a transmitter. The beamforming steering matrix may include a mathematical description of how the antenna array should use each of its individual antenna elements to select a spatial path for transmission. While certain aspects are described herein with respect to channel response information, beamforming state information or beamformer steering matrix state may also be used in the aspects described as well.

The channel information for each of the communication links may be analyzed (e.g., by a hub device or other device in the network, or a remote device communicably coupled to the network) to detect whether motion has occurred in the space, to determine a relative location of the detected motion, or both. In some aspects, the channel information for each of the communication links may be analyzed to detect whether an object is present or absent, e.g., when no motion is detected in the space.

In some implementations, the wireless communication network may include a wireless mesh network. A wireless mesh network may refer to a decentralized wireless network whose nodes (e.g. wireless communication devices) communicate directly in a point-to-point manner without using a central access point, base station or network controller. Wireless mesh networks may include mesh clients, mesh routers, or mesh gateways. In some instances, a wireless mesh network is based on the IEEE 802.11s standard. In some instances, a wireless mesh network is based on Wi-Fi ad hoc or another standardized technology. Examples of commercially-available wireless mesh networks include Wi-Fi systems sold by Google, Eero, and others.

In some example wireless communication networks, each node is connected to one or more other nodes through one or more bi-directional links. Each node can analyze the wireless signals that it receives to identify the perturbation or disturbance on each of the links. The disturbance on each link can be represented as a motion indicator value, for example, as a scalar quantity that can be normalized. The link disturbance values from the nodes in the wireless communication network can be used to determine the probability of motion at the locations associated with the respective node. For example, the probability of motion at each node can be used to tell which node has the highest probability of having motion in its vicinity, and that node can be identified as the node around which the motion occurred. In order to do this, the analysis can be case in a Bayesian estimation framework, for the recursive computation of probabilities. The probabilistic framework offers a number of technical advantages, for example, providing recursive estimation and hence eventual convergence to a correct result, simplistic logic with no conditions for each special situation, performance that is more accurate and robust (e.g., to artifacts) and others.

In addition, physical insights regarding the motion detection system can inform the Bayesian estimation framework that is used to detect the location of motion. For example, the relative magnitude of excitation on a link (between a transmitter node and receiver node) is likely to be greater when the motion that creates the excitation is nearer the receiver node. Accordingly, as an initial probability estimate for where motion occurred, the highest probabilities can be assigned to the receiver nodes on wireless links associated with the highest motion indicator values. This initial probability estimate can be combined with a conditional probability distribution (e.g., based on prior motion data) to produce a recursively refined probability estimate according to a Bayesian framework. As another example, in certain contexts the likelihood of motion transitioning between distinct locations can be higher or lower, relative to the likelihood of motion remaining in a single location. Accordingly, location transition probabilities can be incorporated into the Bayesian framework. For example, a transition probability matrix can be combined with the initial probability estimate and the conditional probability distribution to produce the recursively refined probability estimate according to the Bayesian framework.

FIG. 1 is a diagram showing an example wireless communication system 100. The example wireless communication system 100 includes three wireless communication devices—a first wireless communication device 102A, a second wireless communication device 102B, and a third wireless communication device 102C. The example wireless communication system 100 may include additional wireless communication devices 102 and/or other components (e.g., one or more network servers, network routers, network switches, cables, or other communication links, etc.).

The example wireless communication devices 102A, 102B, 102C can operate in a wireless network, for example, according to a wireless network standard or another type of wireless communication protocol. For example, the wireless network may be configured to operate as a Wireless Local Area Network (WLAN), a Personal Area Network (PAN), a metropolitan area network (MAN), or another type of wireless network. Examples of WLANs include networks configured to operate according to one or more of the 802.11 family of standards developed by IEEE (e.g., Wi-Fi networks), and others. Examples of PANs include networks that operate according to short-range communication standards (e.g., BLUETOOTH®, Near Field Communication (NFC), ZigBee), millimeter wave communications, and others.

In some implementations, the wireless communication devices 102A, 102B, 102C may be configured to communicate in a cellular network, for example, according to a cellular network standard. Examples of cellular networks include networks configured according to 2G standards such as Global System for Mobile (GSM) and Enhanced Data rates for GSM Evolution (EDGE) or EGPRS; 3G standards such as Code Division Multiple Access (CDMA), Wideband Code Division Multiple Access (WCDMA), Universal Mobile Telecommunications System (UMTS), and Time Division Synchronous Code Division Multiple Access (TD-SCDMA); 4G standards such as Long-Term Evolution (LTE) and LTE-Advanced (LTE-A); 5G standards, and others. In the example shown in FIG. 1, the wireless communication devices 102A, 102B, 102C can be, or may include, standard wireless network components. For example, the wireless communication devices 102A, 102B, 102C may be commercially-available Wi-Fi devices.

In some cases, the wireless communication devices 102A, 102B, 102C may be Wi-Fi access points or another type of wireless access point (WAP). The wireless communication devices 102A, 102B, 102C may be configured to perform one or more operations as described herein that are embedded as instructions (e.g., software or firmware) on the wireless communication devices. In some cases, one or more of the wireless communication devices 102A, 102B, 102C may be nodes of a wireless mesh network, such as, for example, a commercially-available mesh network system (e.g., Google Wi-Fi, Eero Wi-Fi systems, etc.). In some cases, another type of standard or conventional Wi-Fi transceiver device may be used. The wireless communication devices 102A, 102B, 102C may be implemented without Wi-Fi components; for example, other types of wireless protocols for wireless communication, either standard or non-standard, may be used for motion detection.

In the example shown in FIG. 1, the wireless communication devices, e.g., 102A, 102B, transmit wireless signals over a communication channel (e.g., according to a wireless network standard, a motion detection protocol, a presence detection protocol, or other standard or non-standard protocol). For example, the wireless communication devices may generate motion probe signals for transmission to probe a space to detect motion or presence of an object. In some implementations, the motion probe signals may include standard signaling or communication frames that include standard pilot signals used in channel sounding (e.g., channel sounding for beamforming according to the IEEE 802.11ac-2013 standard). In some cases, the motion probe signals include reference signals known to all devices in the network. In some instances, one or more of the wireless communication devices may process motion detection signals, which are signals received based on motion probe signals transmitted through the space. For example, the motion detection signals may be analyzed to detect motion of an object in a space, lack of motion in the space, or the presence or absence of an object in the space when lack of motion is detected, based on changes (or lack thereof) detected in the communication channel.

The wireless communication devices transmitting motion probe signals, e.g. 102A, 102B, may be referred to as source devices. In some cases, wireless communication devices 102A, 102B may broadcast the wireless motion probe signals (e.g., described above). In other cases, the wireless communication devices 102A, 102B may send wireless signals addressed to another wireless communication device 102C and other devices (e.g., a user equipment, a client device, a server, etc.). The wireless communication device 102C as well as the other devices (not shown) may receive the wireless signals transmitted by the wireless communication devices 102A, 102B. In some cases, the wireless signals transmitted by the wireless communication devices 102A, 102B are repeated periodically, for example, according to a wireless communication standard or otherwise.

In some examples, the wireless communication device 102C, which may be referred to as a sensor device, processes the wireless signals received from the wireless communication devices 102A, 102B to detect motion, or lack of motion, of an object in a space accessed by the wireless signals. In some examples, another device or computing system processes the wireless signals received by the wireless communication device 102C from the wireless communication devices 102A, 102B to detect motion, or lack of motion, of an object in a space accessed by the wireless signals. In some cases, the wireless communication device 102C (or another system or device) processes the wireless signals to detect the presence or absence of an object in a space when lack of motion is detected. In some instances, the wireless communication device 102C (or another system or device) may perform one or more operations as described in relation to FIG. 6 or in the example method described method to FIG. 8, or another type of process for detecting motion, detecting lack of motion, or detecting the presence or absence of an object when lack of motion is detected. In other examples, the wireless communication system 100 may be modified, for instance, such that the wireless communication device 102C can transmit wireless signals, e.g. as a source device, and the wireless communication devices 102A, 102B may process the wireless signals, e.g. as sensor devices, from the wireless communication device 102C, to detect motion, lack of motion, or presence when no motion is detected. That is, each of the wireless communication devices 102A, 102B, 102C, may be configured, in some cases, as a source device, a sensor device, or both.

The wireless signals used for motion and/or presence detection can include, for example, a beacon signal (e.g., Bluetooth Beacons, Wi-Fi Beacons, other wireless beacon signals), pilot signals (e.g., pilot signals used for channel sounding, such as in beamforming applications, according to the IEEE 802.11ac-2013 standard), or another standard signal generated for other purposes according to a wireless network standard, or non-standard signals (e.g., random signals, reference signals, etc.) generated for motion and/or presence detection or other purposes. In some cases, the wireless signals for motion and/or presence detection are known to all devices in the network.

In some examples, the wireless signals may propagate through an object (e.g., a wall) before or after interacting with a moving object, which may allow the moving object's movement to be detected without an optical line-of-sight between the moving object and the transmission or receiving hardware. In some cases, the wireless signals, when received by a wireless communication device, e.g. 102C, may indicate lack of motion in a space, for example, that an object is not moving, or no longer moving, in the space. In some cases, the wireless signals, when received by a wireless communication device, e.g. 102C, may indicate the presence of an object in the space when lack of motion is detected. Conversely, the wireless signals may indicate the absence of an object in the space when lack of motion is detected. For example, based on the received wireless signals, the third wireless communication device 102C may generate motion data, presence data, or both. In some instances, the third wireless communication device 102C may communicate the motion detection and/or presence data, to another device or system, such as a security system, that may include a control center for monitoring movement within a space, such as a room, building, outdoor area, etc.

In some implementations, the wireless communication devices 102A, 102B may be configured to transmit motion probe signals (e.g., as described above) on a wireless communication channel separate from wireless network traffic signals (e.g., a frequency channel or coded channel). For example, the modulation applied to the payload of a motion probe signal and the type of data or data structure in the payload may be known by the third wireless communication device 102C, which may reduce the amount of processing that the third wireless communication device 102C performs for motion and presence detection. The header may include additional information such as, for example, an indication of whether motion or lack of motion was detected by another device in the communication system 100, whether a presence of an object was detected by another device in the communication system 100, an indication of the modulation type, an identification of the device transmitting the signal, and so forth.

In the example shown in FIG. 1, the wireless communication system 100 is illustrated as a wireless mesh network, with wireless communication links between each of the respective wireless communication devices 102. In the example shown, the wireless communication links between the third wireless communication device 102C and the first wireless communication device 102A can be used to probe a first motion detection zone 110A, the wireless communication links between the third wireless communication device 102C and the second wireless communication device 102B can be used to probe a second motion detection zone 110B, and the wireless communication links between the first wireless communication device 102A and the second wireless communication device 102B can be used to probe a third motion detection zone 110C. In some instances, each wireless communication device 102 may be configured to detect motion, lack of motion, and/or the presence or absence of an object when no motion is detected, in each of the motion detection zones 110 accessed by that device by processing received signals that are based on wireless signals transmitted by the wireless communication devices 102 through the motion detection zones 110. For example, when a person 106 moves in the first motion detection zone 110A and the third motion detection zone 110C, the wireless communication devices 102 may detect the motion based on signals they receive that are based on wireless signals transmitted through the respective motion detection zones 110. For instance, the first wireless communication device 102A can detect motion of the person in both the first and third motion detection zones 110A, 110C, the second wireless communication device 102B can detect motion of the person 106 in the third motion detection zone 110C, and the third wireless communication device 102C can detect motion of the person 106 in the first motion detection zone 110A. In some cases, lack of motion by the person 106 and, in other cases, the presence of the person 106 when the person 106 is not detected to be moving, may be detected in each of the motion detection zones 110A, 110B, 110C.

In some instances, the motion detection zones 110 can include, for example, air, solid materials, liquids, or another medium through which wireless electromagnetic signals may propagate. In the example shown in FIG. 1, the first motion detection zone 110A provides a wireless communication channel between the first wireless communication device 102A and the third wireless communication device 102C, the second motion detection zone 110B provides a wireless communication channel between the second wireless communication device 102B and the third wireless communication device 102C, and the third motion detection zone 110C provides a wireless communication channel between the first wireless communication device 102A and the second wireless communication device 102B. In some aspects of operation, wireless signals transmitted on a wireless communication channel (separate from or shared with the wireless communication channel for network traffic) are used to detect movement or lack of movement of an object in a space, and may be used to detect the presence (or absence) of an object in the space when there is a lack of movement detected. The objects can be any type of static or moveable object, and can be living or inanimate. For example, the object can be a human (e.g., the person 106 shown in FIG. 1), an animal, an inorganic object, or another device, apparatus, or assembly, an object that defines all or part of the boundary of a space (e.g., a wall, door, window, etc.), or another type of object. In some implementations, motion information from the wireless communication devices may trigger further analysis to determine the presence or absence of an object when motion of the object is not detected.

In some implementations, the wireless communication system 100 may be, or may include, a motion detection system. The motion detection system may include one or more of the wireless communication devices 102A, 102B, 102C and possibly other components. One or more wireless communication devices 102A, 102B, 102C in the motion detection system may be configured for motion detection, presence detection, or both. The motion detection system may include a database that stores signals. One of the wireless communication devices 102A, 102B, 102C of the motion detection system may operate as a central hub or server for processing received signals and other information to detect motion and/or presence. The storage of data—e.g., in the database, and/or the determination of motion, lack of motion (e.g., a steady state), or presence detection—may be performed by a wireless communication device 102, or in some cases, may be performed by another device in the wireless communication network or in the cloud (e.g., by one or more remote devices).

Figure 2A:
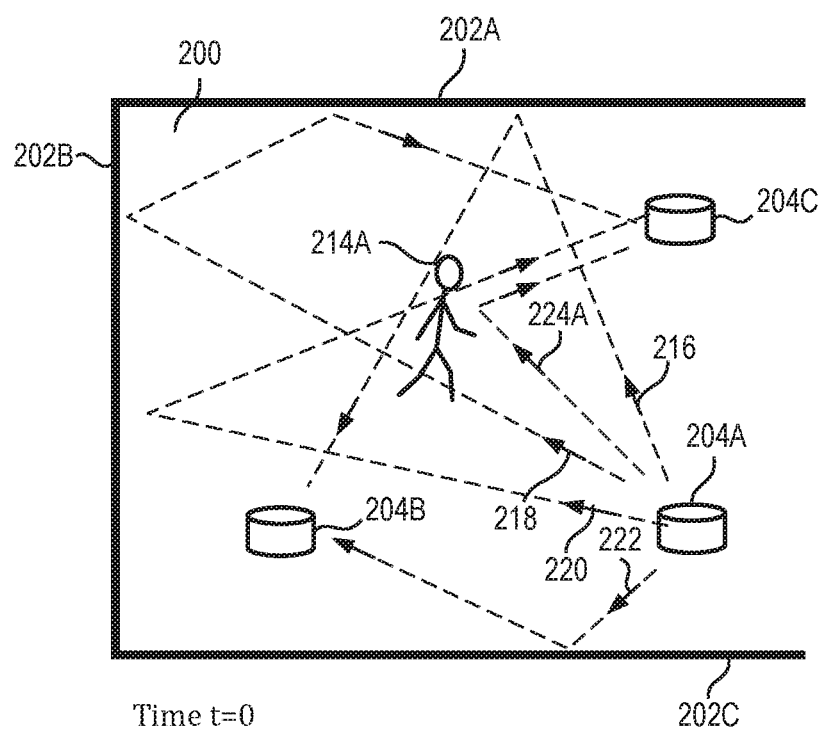
FIGS. 2A and 2B are diagrams showing example wireless signals communicated between wireless communication devices in a motion detection system.
Figure 2B:
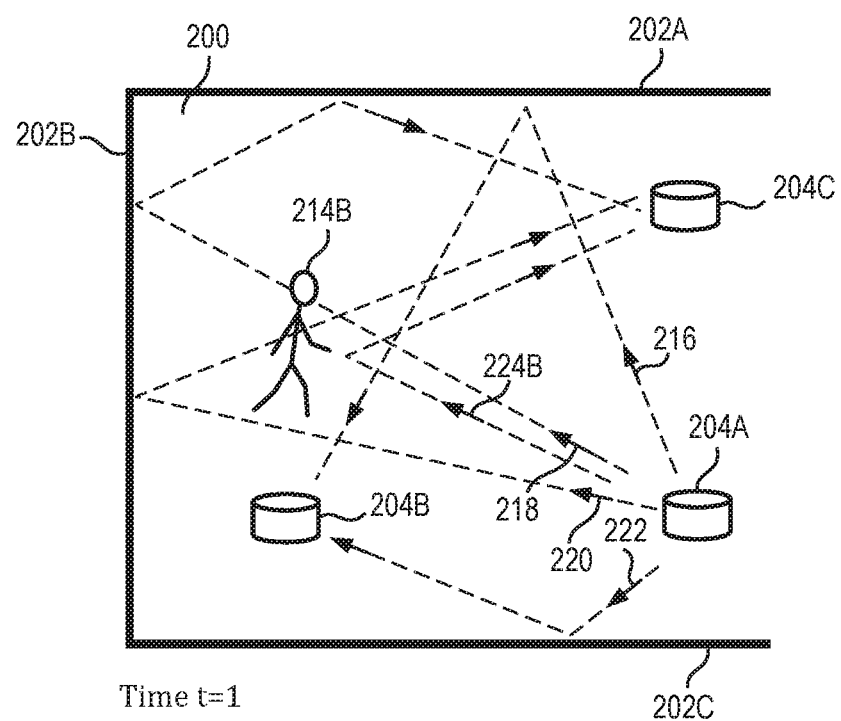

FIGS. 2A and 2B are diagrams showing example wireless signals communicated between wireless communication devices 204A, 204B, 204C in a motion detection system. The wireless communication devices 204A, 204B, 204C may be, for example, the wireless communication devices 102A, 102B, 102C shown in FIG. 1, or may be other types of wireless communication devices. Examples of wireless communication devices include wireless mesh devices, stationary wireless client devices, mobile wireless client devices, and so forth.

In some cases, a combination of one or more of the wireless communication devices 204A, 204B, 204C can form, or may be part of, a dedicated motion detection system. For example, as part of the dedicated motion detection system, one or more of the wireless communication devices 204A, 204B, 204C may be configured for motion detection, presence detection, or both, in the motion detection system. In some cases, a combination of one or more of the wireless communication devices 204A, 204B, 204C may be, or may be part of, an ad hoc motion detection system that also performs other types of functions.

The example wireless communication devices 204A, 204B, 204C may transmit and/or receive wireless signals through a space 200. The example space 200 may be completely or partially enclosed or open at one or more boundaries of the space 200. The space 200 may be or may include an interior of a room, multiple rooms, a building, an indoor area, outdoor area, or the like. A first wall 202A, a second wall 202B, and a third wall 202C at least partially enclose the space 200 in the example shown.

In the example shown in FIGS. 2A and 2B, the first wireless communication device 204A is operable to transmit wireless motion probe signals repeatedly (e.g., periodically, intermittently, at scheduled, unscheduled or random intervals, etc.), e.g., as a source device. The second and third wireless communication devices 204B, 204C are operable to receive signals based on the motion probe signals transmitted by the wireless communication device 204A, e.g., as a sensor device. The motion probe signals may be formatted as described above. For example, in some implementations, the motion probe signals include standard signaling or communication frames that include standard pilot signals used in channel sounding (e.g., channel sounding for beamforming according to the IEEE 802.11ac-2013 standard). The wireless communication devices 204B, 204C each have an interface, modem, processor, or other component that is configured to process received motion detection signals to detect motion or lack of motion, of an object in the space 200. In some instances, the wireless communication devices 204B, 204C may each have an interface, modem, processor, or other component that is configured to detect the presence or absence of an object in the space 200 when lack of motion is detected, for example, whether the space is occupied or non-occupied.

As shown, an object is in a first position 214A at an initial time t=0 in FIG. 2A, and the object has moved to a second position 214B at subsequent time t=1 in FIG. 2B. In FIGS. 2A and 2B, the moving object in the space 200 is represented as a human, but the moving object can be another type of object. For example, the moving object can be an animal, an inorganic object (e.g., a system, device, apparatus, or assembly), an object that defines all or part of the boundary of the space 200 (e.g., a wall, door, window, etc.), or another type of object. For this example, the representation of the object's 214 movement is merely indicative that the object's location changed within the space 200 between time t=0 and time t=1.

As shown in FIGS. 2A and 2B, multiple example paths of the wireless signals transmitted from the first wireless communication device 204A are illustrated by dashed lines. Along a first signal path 216, the wireless signal is transmitted from the first wireless communication device 204A and reflected off the first wall 202A toward the second wireless communication device 204B. Along a second signal path 218, the wireless signal is transmitted from the first wireless communication device 204A and reflected off the second wall 202B and the first wall 202A toward the third wireless communication device 204C. Along a third signal path 220, the wireless signal is transmitted from the first wireless communication device 204A and reflected off the second wall 202B toward the third wireless communication device 204C. Along a fourth signal path 222, the wireless signal is transmitted from the first wireless communication device 204A and reflected off the third wall 202C toward the second wireless communication device 204B.

In FIG. 2A, along a fifth signal path 224A, the wireless signal is transmitted from the first wireless communication device 204A and reflected off the object at the first position 214A toward the third wireless communication device 204C. Between time t=0 in FIG. 2A and time t=1 in FIG. 2B, a surface of the object moves from the first position 214A to a second position 214B in the space 200 (e.g., some distance away from the first position 214A). In FIG. 2B, along a sixth signal path 224B, the wireless signal is transmitted from the first wireless communication device 204A and reflected off the object at the second position 214B toward the third wireless communication device 204C. The sixth signal path 224B depicted in FIG. 2B is longer than the fifth signal path 224A depicted in FIG. 2A due to the movement of the object from the first position 214A to the second position 214B. In some examples, a signal path can be added, removed, or otherwise modified due to movement of an object in a space.

The example wireless signals shown in FIGS. 2A and 2B may experience attenuation, frequency shifts, phase shifts, or other effects through their respective paths and may have portions that propagate in another direction, for example, through the walls 202A, 202B, and 202C. In some examples, the wireless signals are radio frequency (RF) signals. The wireless signals may include other types of signals.

In the example shown in FIGS. 2A and 2B, the first wireless communication device 204A may be configured as a source device and may repeatedly transmit a wireless signal. For example, FIG. 2A shows the wireless signal being transmitted from the first wireless communication device 204A during a first time t=0. The transmitted signal may be transmitted continuously, periodically, at random or intermittent times or the like, or a combination thereof. For example, the transmitted signal may be transmitted one or more times between time t=0 and a subsequent time t=1 illustrated in FIG. 2B, or any other subsequent time. The transmitted signal may have a number of frequency components in a frequency bandwidth. The transmitted signal may be transmitted from the first wireless communication device 204A in an omnidirectional manner, in a directional manner or otherwise. In the example shown, the wireless signals traverse multiple respective paths in the space 200, and the signal along each path may become attenuated due to path losses, scattering, reflection, or the like and may have a phase or frequency offset.

As shown in FIGS. 2A and 2B, the signals from various paths 216, 218, 220, 222, 224A, and 224B combine at the third wireless communication device 204C and the second wireless communication device 204B to form received signals. Because of the effects of the multiple paths in the space 200 on the transmitted signal, the space 200 may be represented as a transfer function (e.g., a filter) in which the transmitted signal is input and the received signal is output. When an object moves in the space 200, the attenuation or phase offset affected upon a signal in a signal path can change, and hence, the transfer function of the space 200 can change. Assuming the same wireless signal is transmitted from the first wireless communication device 204A, if the transfer function of the space 200 changes, the output of that transfer function, e.g. the received signal, will also change. A change in the received signal can be used to detect movement of an object. Conversely, in some cases, if the transfer function of the space does not change, the output of the transfer function—the received signal—does not change. Lack of change in the received signal (e.g., a steady state) may indicate lack of movement in the space 200.

Mathematically, a transmitted signal f(t) transmitted from the first wireless communication device 204A may be described according to Equation (1):

$$f(t) = \sum_{n=-\infty}^{\infty} c_n e^{j\omega_n t} \tag{1}$$

where $\omega_n$ represents the frequency of nth frequency component of the transmitted signal, $c_n$ represents the complex coefficient of the nth frequency component, and t represents time. With the transmitted signal f(t) being transmitted from the first wireless communication device 204A, an output signal $r_k(t)$ from a path k may be described according to Equation (2):

$$r_k(t) = \sum_{n=-\infty}^{\infty} \alpha_{n,k} c_n e^{j(\omega_n t + \phi_{n,k})} \tag{2}$$

where $\alpha_{n,k}$ represents an attenuation factor (or channel response; e.g., due to scattering, reflection, and path losses) for the nth frequency component along path k, and $\phi_{n,k}$ represents the phase of the signal for nth frequency component along path k. Then, the received signal R at a wireless communication device can be described as the summation of all output signals $r_k(t)$ from all paths to the wireless communication device, which is shown in Equation (3):

$$R = \sum_k r_k(t) \tag{3}$$

Substituting Equation (2) into Equation (3) renders the following Equation (4):

$$R = \sum_k \sum_{n=-\infty}^{\infty} (\alpha_{n,k} e^{j\phi_{n,k}}) c_n e^{j\omega_n t} \tag{4}$$

The received signal R at a wireless communication device can then be analyzed. The received signal R at a wireless communication device can be transformed to the frequency domain, for example, using a Fast Fourier Transform (FFT) or another type of algorithm. The transformed signal can represent the received signal R as a series of n complex values, one for each of the respective frequency components (at the n frequencies $\omega_n$). For a frequency component at frequency $\omega_n$, a complex value $Y_n$ may be represented as follows in Equation (5):

$$Y_n = \sum_k c_n \alpha_{n,k} e^{j\phi_{n,k}} \quad (5)$$

The complex value $Y_n$ for a given frequency component $\omega_n$ indicates a relative magnitude and phase offset of the received signal at that frequency component $\omega_n$. When an object moves in the space, the complex value $Y_n$ changes due to the channel response $\alpha_{n,k}$ of the space changing. Accordingly, a change detected in the channel response (and thus, the complex value $Y_n$) can be indicative of movement of an object within the communication channel. Conversely, a stable channel response (or "steady state"), for example, when no change or only small changes are detected in the channel response (or the complex value $Y_n$), indicates lack of movement. Thus, in some implementations, the complex value $Y_n$ for each of multiple devices in a wireless mesh network can be analyzed to detect whether motion has occurred, or whether there is lack of motion, in a space traversed by the transmitted signals f(t). In some cases, when lack of movement is detected, further analysis may be performed on the channel response to determine if an object is present in the space, but not moving.

In another aspect of FIGS. 2A and 2B, beamforming may be performed between devices based on some knowledge of the communication channel (e.g., through feedback properties generated by a receiver), which can be used to generate one or more steering properties (e.g., a steering matrix) that are applied by a transmitter device to shape the transmitted beam/signal in a particular direction or directions. Thus, changes to the steering or feedback properties used in the beamforming process indicate changes, which may be caused by moving objects, in the space accessed by the wireless communication system. For example, motion may be detected by substantial changes in the communication channel, e.g., as indicated by a channel response, or steering or feedback properties, or any combination thereof, over a period of time.

In some implementations, for example, a steering matrix may be generated at a transmitter device (beamformer) based on a feedback matrix provided by a receiver device (beamformee) based on channel sounding. Because the steering and feedback matrices are related to the propagation characteristics of a channel, these matrices change as objects move within the channel. Changes in the channel characteristics are accordingly reflected in these matrices, and by analyzing the matrices, motion can be detected, and different characteristics of the detected motion can be determined. In some implementations, a spatial map may be generated based on one or more beamforming matrices. The spatial map may indicate a general direction of an object in a space relative to a wireless communication device. In some cases, "modes" of a beamforming matrix (e.g., a feedback matrix or steering matrix) can be used to generate the spatial map. The spatial map may be used to detect the presence of motion in the space or to detect a location of the detected motion.

In some instances, the channel information (e.g., channel response information or beamforming state information, as described above) derived from wireless signals can be used to compute motion indicator values. For example, a set of motion indicator values for a given time frame may represent the levels of disturbance detected on the respective wireless links that communicated the wireless signals during the time frame. In some cases, the channel information can be filtered or otherwise modified, for instance, to reduce the effects of noise and interference on the motion indicator values. In some contexts, a higher magnitude motion indicator value may represent a higher level of disturbance, while a lower magnitude motion indicator value may represent a relatively lower level of disturbance. For instance, each motion indicator value can be an individual scalar quantity, and the motion indicator values can be normalized (e.g., to unity or otherwise).

In some cases, the motion indicator values associated with a time frame can be used collectively to make an overall determination, for example, whether motion occurred in the space during the time frame, where motion occurred in the space during the time frame, etc. For instance, a motion consensus value for a time frame may indicate the overall determination of whether motion occurred in the space based on all (or a subset) of motion indicator values for the time frame. In some cases, a more accurate, reliable or robust determination can be made by analyzing multiple motion indicator values for a time frame collectively. And in some cases, data sets can be updated recursively to further improve the accuracy, for example, of location determinations. For instance, the motion indicator values for each sequential time frame can be used to recursively update data sets representing the conditional probability of detecting motion at distinct locations in the space, and the recursively updated data sets can be used to make an overall determination of where motion occurred during a subsequent time frame.

Figure 3:
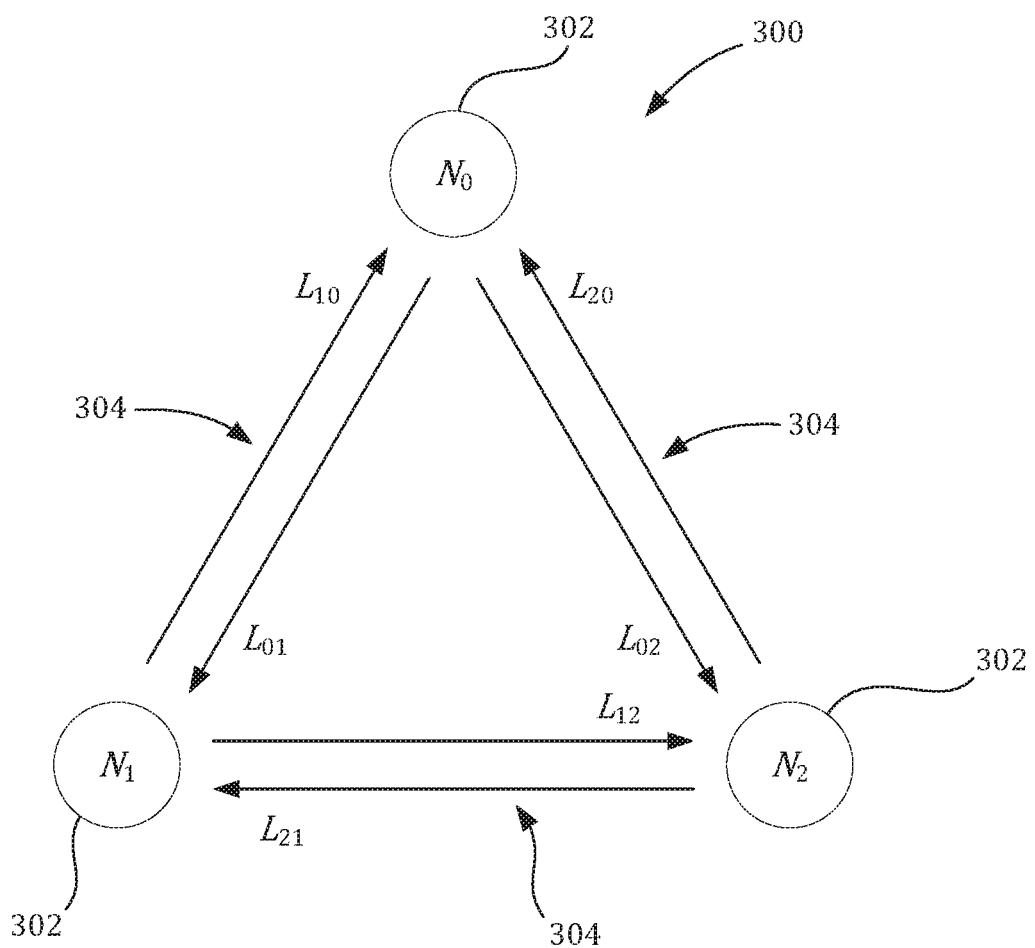
FIG. 3 is a schematic diagram of an example wireless communication network that includes a plurality of wireless nodes.

FIG. 3 is a schematic diagram of an example wireless communication network 300 that includes a plurality of wireless nodes 302. The plurality of wireless nodes 302 may be analogous to the wireless communication devices 102, 204 of FIGS. 1 and 2A-2B, respectively. In FIG. 3, three wireless nodes 302 are depicted, labeled $N_0$, $N_1$, and $N_2$. However, other numbers of wireless nodes 302 are possible in the wireless communication network 300. Moreover, other types of nodes are possible. For example, the wireless communication network 300 may include one or more network servers, network routers, network switches, network repeaters, or other type of networking or computing equipment.

The wireless communication network 300 includes wireless communication channels 304 communicatively coupling respective pairs of wireless nodes 302. Such communicative coupling may allow an exchange of wireless signals between wireless nodes 302 over a time frame. In particular, the wireless communication channels 304 allow bi-directional communication between the respective pairs of wireless nodes 302. Such communication may occur along two directions simultaneously (e.g., full duplex) or along only one direction at a time (e.g., half duplex). In some instances, such as shown in FIG. 3, the wireless communication channels 304 communicatively couple every pair of the plurality of wireless nodes 302. In other instances, one or more pairs of wireless nodes 302 may lack a corresponding wireless communication channel 304.

Each wireless communication channel 304 includes two or more wireless links, including at least one for each direction in the bi-directional communication. In FIG. 3, an arrow represents each individual wireless link. The arrow is labeled $L_{ij}$ where a first subscript, i, indicates a transmitting wireless node and a second subscript, j, indicates a receiving wireless node. For example, wireless nodes $N_0$ and $N_1$ are communicatively coupled by two wireless links that are indicated in FIG. 3 by two arrows, $L_{01}$ and $L_{10}$. Wireless link $L_{01}$ corresponds to wireless communication along a first direction from $N_0$ to $N_1$ and wireless link $L_{10}$ corresponds wireless communication along a second, opposing direction from $N_1$ to $N_0$.

In some implementations, the wireless communication network 300 obtains a set of motion indicator values associated with a time frame, which may include the processes of motion detection described in relation to FIGS. 2A-2B. The set of motion indicator values indicate motion detected from wireless links in a wireless communication network. Each motion indicator value is associated with a respective wireless link. The motion may be detected using one or more wireless links (e.g., one or more wireless links $L_{01}$, $L_{10}$, $L_{02}$, $L_{20}$, $L_{12}$, and $L_{21}$ of FIG. 3) in the wireless communication network (e.g., the wireless communication network 300). Each of the wireless links is defined between a respective pair of wireless communication devices in the wireless communication network (e.g., pair combinations of wireless nodes $N_0$, $N_1$, and $N_2$).

In some variations, the wireless communication network 300 may include a data processing apparatus that executes program instructions (e.g., a network server, a wireless communication device, a network router, etc.). The program instructions may cause the data processing apparatus to assign a unique node identifier to each of the wireless nodes 302 in the wireless communication network 300. The unique node identifier may be mapped to a media access control (MAC) address value, which corresponds to a MAC address (or portion thereof) associated with a wireless node. For example, the wireless nodes $N_0$, $N_1$, and $N_2$ of FIG. 3 may be associated with a six-character portion of their respective MAC addresses, which is then mapped to a unique node identifier:

$$\{N_0, N_1, N_2\} \rightarrow \{7f4440, 7f4c9e, 7f630c\} \rightarrow \{0,1,2\}$$

Here, the MAC address values of 7f4440, 7f4c9e, and 7f630c are mapped to respective unique node identifiers 0, 1, and 2. The program instructions may also cause the data processing apparatus to associate the wireless links with their respective pairs of wireless nodes via corresponding pairs of MAC address values. The MAC address values may then be mapped to a unique link identifier to form a link table. For example, the wireless links $L_{01}$, $L_{10}$, $L_{02}$, $L_{20}$, $L_{12}$, and $L_{21}$ of FIG. 3 may be mapped to unique link identifiers according to:

$$\begin{Bmatrix} L_{01} \\ L_{02} \\ L_{10} \\ L_{12} \\ L_{20} \\ L_{21} \end{Bmatrix} \rightarrow \begin{pmatrix} 7f4440 \rightarrow 7f4c9e \\ 7f4440 \rightarrow 7f630c \\ 7f4c9e \rightarrow 7f4440 \\ 7f4c9e \rightarrow 7f630c \\ 7f630c \rightarrow 7f4440 \\ 7f630c \rightarrow 7f4c9e \end{pmatrix} \rightarrow \begin{Bmatrix} 0 \\ 1 \\ 2 \\ 3 \\ 4 \\ 5 \end{Bmatrix}$$

The MAC address values may be ordered, from left to right, to indicate respective pairs of transmitting and receiving wireless nodes in a wireless link. In particular, the left MAC address value may correspond to a transmitting wireless node and the right MAC address value may correspond to a receiving wireless node. Such mappings of unique node and link identifiers may aid the data processing apparatus in performing operations, such as searching, sorting, and matrix manipulation, during processes of motion detection.

The program instructions may additionally cause the data processing apparatus to poll the wireless links (or wireless nodes 302) to obtain motion indicator values for each wireless link in the plurality of wireless links. For example, the wireless links of the wireless communication network 300 of FIG. 3 may report motion indicator values according to a data structure, such as shown below:

$$\begin{Bmatrix} 0 & 0.00 \\ 1 & 0.00 \\ 2 & 0.71 \\ 3 & 1.07 \\ 4 & 1.15 \\ 5 & 1.30 \end{Bmatrix}$$

In the data structure, the first column corresponds to the unique link identifiers of the wireless links and the second column of the data structure corresponds to their respective motion indicator values. The data structure may be an array, as shown above, or some other type of data structure (e.g., a vector). Although data structure is presented as having three significant digits for each motion indicator value, other numbers of significant digits are possible for the motion indicator values (e.g., 2, 5, 9, etc.).

Figure 4:
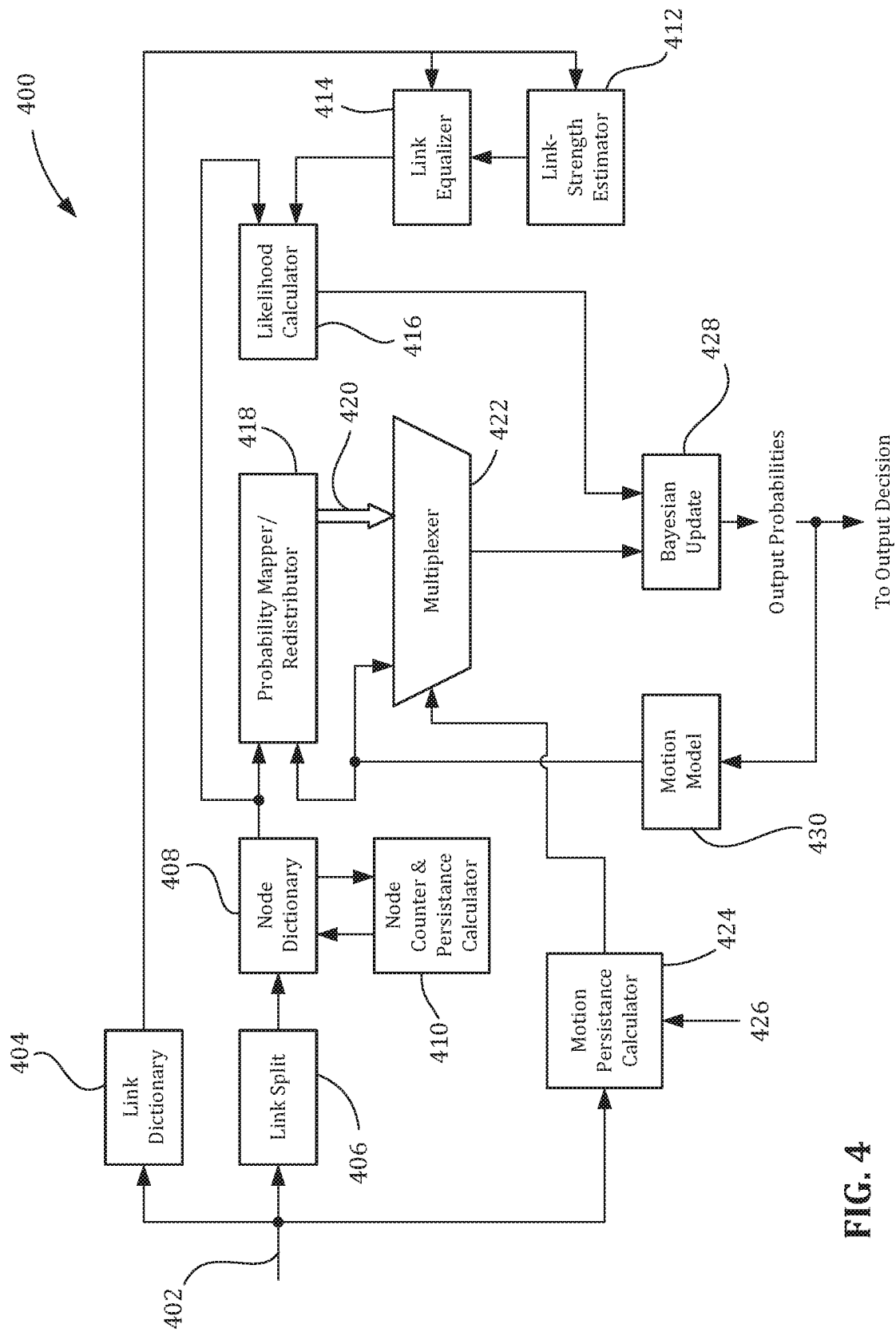
FIG. 4 is a flowchart of an example process for determining a location of motion detected by one or more wireless links in a wireless communication network.

Now referring to FIG. 4, a flowchart 400 is presented of an example process for determining a location of motion detected by one or more wireless links in a wireless communication network. The one or more wireless links may be part of a plurality of wireless links defined by respective pairs of wireless nodes, such as the wireless nodes 302 of FIG. 3. The wireless communication network may include a data processing apparatus (e.g., one or more of the wireless nodes may serve as the data processing apparatus). Alternatively, the data processing apparatus may be communicatively-coupled to the wireless communication network through a data connection (e.g., a wireless connection, a copper-wired connection, a fiber optic connection, etc.). The data processing apparatus may receive a data structure associated with a time frame, as shown by line 402. The data structure 402 may map the plurality of wireless links with their respective motion indicator values for the time frame. The plurality of wireless links may be represented by unique link identifiers in the data structure 402. However, other representations are possible. For example, the plurality of wireless links may be represented by respective pairs of unique node identifiers. In some instances, the data structure 402 may associate each of the unique link identifiers with a corresponding pair of unique node identifiers.

The data processing apparatus executes program instructions to generate, from the data structure 402, wireless links that are present in the wireless communication network during the time frame. The generated wireless links and their respective motion indicator values may be stored in a first memory of the data processing apparatus (or motion detection system) that serves as a link dictionary. The link dictionary is shown by block 404 of FIG. 4. The link dictionary 404 is operable to track wireless links present in the wireless communication network over successive time frames. For example, when a new wireless link is observed in the wireless communication network, the data processing apparatus updates the link dictionary 404 to include the new wireless link. In another example, when an existing wireless link is no longer observed in the wireless communication network, the data processing apparatus updates the link dictionary 404 to remove the (prior) existing wireless link. Wireless links may be represented in the link dictionary 404 by unique link identifiers, respective pairs of unique node identifiers, or both. However, other representations are possible.

The data processing apparatus also executes program instructions to generate, from the data structure 402, wireless nodes present in the wireless communication network during the time frame. In particular, the program instructions direct the data processing apparatus to "split" each generated wireless link into individual wireless nodes of its respective pair of wireless nodes, as shown in block 406. The program instructions also direct the data processing apparatus to sort or filter through the individual wireless nodes to identify unique wireless nodes in the wireless communication network during the time frame. Given that a single wireless node may be shared in common between two or more wireless links, the link dictionary 404 alone may not be sufficient in establishing unique wireless nodes of the wireless communication network. The unique wireless nodes may then be stored in a second memory of the data processing apparatus (or motion detection system) that serves as a node dictionary. The node dictionary is shown by block 408 of FIG. 4. The node dictionary 408 is operable to maintain a list of unique wireless nodes present in the wireless communication network over successive time frames. The unique wireless nodes may be represented in the node dictionary 408 by respective unique node identifiers. However, other representations are possible.

A node counter and persistence calculator may be communicatively-coupled to the node dictionary 408, as shown by block 410. In many instances, the node counter and persistence calculator 410 is part of the data processing apparatus. The node counter and persistence calculator 410 is operable to track wireless nodes present in the wireless communication network over successive time frames and update the node dictionary 408 accordingly. Such tracking may include timing an appearance (or disappearance) of one or more wireless nodes. For example, when a new wireless node connects to the wireless communication network, the node counter and persistence calculator 410 updates the node dictionary 408 to include the new wireless node. In another example, when a wireless node disconnects from the wireless communication network, the node counter and persistence calculator 410 updates the node dictionary 408 to remove the disconnected wireless node. Such updating may occur after a predetermined number of time frames have elapsed where the wireless node is not connected to the wireless communication network.

The data processing apparatus additionally executes program instructions to alter one or more magnitudes of the set of motion indicator values to reference each motion indicator value to a common scale of wireless link sensitivity. More specifically, the data processing apparatus may function, in part, as a link strength estimator, such as shown by block 412, and a link equalizer, such as shown by block 414. The link strength estimator 412 and the link equalizer 414 receive, from the link dictionary 404, an identity of wireless links that are present in the wireless communication network during the time frame as well as their respective motion indicator values. The link equalizer 414 also receives, from the link strength estimator 412, an equalization value for each of the identified wireless links. The link strength estimator 412 and the link equalizer 414 operate cooperatively to reference the motion indicator values of each identified wireless links to a common scale of wireless link sensitivity.

In operation, the link strength estimator 412 estimates a link strength of the identified wireless links by determining a statistical property of their respective motion indicator values. The statistical property may be a maximum motion indicator value, a deviation of a motion indicator value from a mean value, or a standard deviation. Other statistical properties are possible. In some instances, the link strength estimator 412 tracks the statistical properties of one or more respective motion indicator values over successive time frames. The statistical property may allow the link strength estimator 412 to gauge an excitation strength and corresponding dynamic range of a wireless link. Such gauging may account for a unique sensitivity of each identified wireless link. The link strength estimator 412 passes the determined statistical values to the link equalizer 414, which in turn, utilizes them as equalization values for respective motion indicator values. In particular, the link equalizer 414 divides the motion indicator value of each identified wireless link with its respective equalization value (or statistical property) to generate a normalized motion indicator value. In this manner, the link equalizer 414 "equalizes" the identified wireless links so that their respective responses to motion or other events may be compared independent of sensitivity.

For example, due to motion or another event, a first subset of wireless links may become strongly excited and exhibit correspondingly high dynamic ranges (or sensitivities). A second subset of wireless links may become weakly excited and exhibit correspondingly low dynamic ranges (or sensitivities) due to the same motion or event. Such excitations and corresponding dynamic ranges are reflected in the motion indicator values received by the link strength estimator 412 and the link equalizer 414 from the link dictionary 404. However, the link strength estimator 412 and link equalizer 414 operate cooperative to normalize the received motion indicator values to a common scale of wireless link sensitivity. Such normalization ensures that comparisons of the first and second subsets of wireless links within the plurality of wireless links do not overweight the first subset of wireless links relative to the second subset. Other benefits are normalization are possible.

The program instructions may further cause the data processing apparatus to identify a subset of wireless links based on a magnitude of their associated motion indicator values relative to the other motion indicator values in the set of motion indicator values. In particular, the data processing apparatus may receive the identified wireless links and their respective normalized motion indicator values from the link equalizer 414 and store this data in a memory associated with a likelihood calculator, such as shown by block 416. As part of this operation, the data processing apparatus may also receive the list of unique wireless nodes from the node dictionary 408 and store the list in the memory associated with the likelihood calculator 416. The data processing apparatus may function, in part, as the likelihood calculator 416.

The likelihood calculator 416 identifies a subset of wireless links based on a magnitude of their respective, normalized motion indicator values relative to other normalized motion indicator values. To do so, the likelihood calculator 416 may sort or filter through the normalized motion indicator values received from the link equalizer 414 to identify the subset of wireless links. For example, the likelihood calculator 416 may sort the data stored in the memory according to magnitude to determine a highest normalized motion indicator value, thereby generating a subset of wireless links with a single wireless link. In another example, the likelihood calculator 416 may sort the data in the memory according to magnitude to determine the three highest normalized motion indicator values, thereby generating a subset of wireless with three wireless links. Other numbers of wireless links are possible for the subset of wireless links.

The likelihood calculator 416 also generates count values for the wireless nodes connected to the wireless communication network during the time frame. The count value for each wireless node indicates how many wireless links in the subset of wireless links are defined by the wireless node. For example, and with reference to FIG. 3, the likelihood calculator 416 may identify a subset of wireless links based on the three highest normalized motion indicator values:

$$\begin{Bmatrix} 0 & 0.00 \\ 1 & 0.00 \\ 2 & 0.24 \\ 3 & 0.36 \\ 4 & 0.40 \\ 5 & 0.65 \end{Bmatrix} \rightarrow \begin{Bmatrix} 3 & 0.36 \\ 4 & 0.40 \\ 5 & 0.65 \end{Bmatrix}$$

The unique link identifiers of 3, 4, and 5 correspond to wireless nodes $N_0$, $N_1$, and $N_2$ as shown below:

$$\begin{Bmatrix} 3 & 0.36 \\ 4 & 0.40 \\ 5 & 0.65 \end{Bmatrix} \rightarrow \begin{Bmatrix} 7f4c9e \rightarrow 7f630c & 0.36 \\ 7f630c \rightarrow 7f4440 & 0.40 \\ 7f630c \rightarrow 7f4c9e & 0.65 \end{Bmatrix} \rightarrow \begin{Bmatrix} N_1 \rightarrow N_2 & 0.36 \\ N_2 \rightarrow N_0 & 0.40 \\ N_2 \rightarrow N_1 & 0.65 \end{Bmatrix}$$

Here, wireless node $N_0$ assists in defining one wireless link in the subset of wireless links, i.e., $N_2 \rightarrow N_0$. Similarly, wireless node $N_1$ assists in defining two wireless links in the subset of wireless links, i.e., $N_1 \rightarrow N_2$ and $N_2 \rightarrow N_1$, and wireless node $N_2$ assists in defining three wireless links in the subset of wireless links, i.e., $N_1 \rightarrow N_2$, $N_2 \rightarrow N_0$, and $N_2 \rightarrow N_1$. Accordingly, the likelihood calculator 416 generates count values of 1, 2, and 3 for respective wireless nodes $N_0$, $N_1$, and $N_2$. In the present example, all wireless nodes of the wireless communication network assist in defining a wireless link of the subset of wireless links. However, for wireless nodes that do not assist in defining a wireless link of the subset of wireless links, the likelihood calculator 416 may generate a count value of zero. In some instances, the likelihood calculator 416 generates a count-value data structure associating each wireless node connected to the wireless communication network during the time frame with its respective count value. For the present example, the likelihood calculator 416 may generate the following the count-value data structure:

$$\begin{Bmatrix} N_0 & 1 \\ N_1 & 2 \\ N_2 & 3 \end{Bmatrix}$$

Although wireless nodes in the count-value data structure are represented by the label, $N_i$, where i represents a number of a wireless node, other representations are possible (e.g., partial MAC addresses).

The likelihood calculator 416 further generates a probability vector based on the count values that includes values for each wireless node connected to the wireless communication network during the time frame. The values for each connected wireless node represent a probability of motion at the connected wireless node during the time frame. In particular, the values may represent a probability that motion at (or proximate to) a respective wireless node induces link activity along a particular wireless link. In some instances, the values sum to unity. In these instances, the values may be probability values. The likelihood calculator 416 passes the generated probability vector to a Bayesian update engine, as shown in FIG. 4.

In some instances, the values for each connected wireless node are likelihood values assigned from a link likelihood map. The likelihood values may not necessary sum to unity. The link likelihood map associates likelihood values with respective magnitudes of count values. The likelihood values and their associations may be predetermined and may further be stored in a memory of the likelihood calculator 416 (or data processing apparatus). For example, if a wireless node is strongly represented in a subset of wireless links, motion detected by the wireless communication network will have a relatively high probability of being located at or near the wireless node. As such, the link likelihood map may associate high likelihood values with proportionately high count values. However, other associations of likelihood values and count values are possible.

In some variations, the probability vector is represented by a probability vector, $P(L_j|N_i)$, that includes probability values based on the link likelihood map. The probability values correspond to probabilities that a wireless link, $L_j$, exhibits link activity given motion at a wireless node, $N_i$. For example, and with reference to FIG. 3, the likelihood calculator 416 may generate a subset of wireless links that includes only wireless link $L_{02}$, which has a unique link identifier of "1". As such, $P(L_j|N_i) = P(1|N_i) = \{P(1|0), P(1|1), P(1|2)\}$. Here, $P(1|0)$ corresponds to the probability that motion at wireless node 0 induces link activity along wireless link 1, $P(1|1)$ corresponds to the probability that motion at wireless node 1 induces link activity along wireless link 1, and $P(1|2)$ corresponds to the probability that motion at wireless node 2 induces link activity along wireless link 1. These probability values can be generated from likelihood values of the link likelihood map. For example, the likelihood calculator 416 may assign wireless nodes 0, 1, and 2 each a likelihood value based on a respective count value. The likelihood calculator 416 may then normalize the assigned likelihood values to unity, thereby generating corresponding probability values for each wireless node.

Figure 5A:
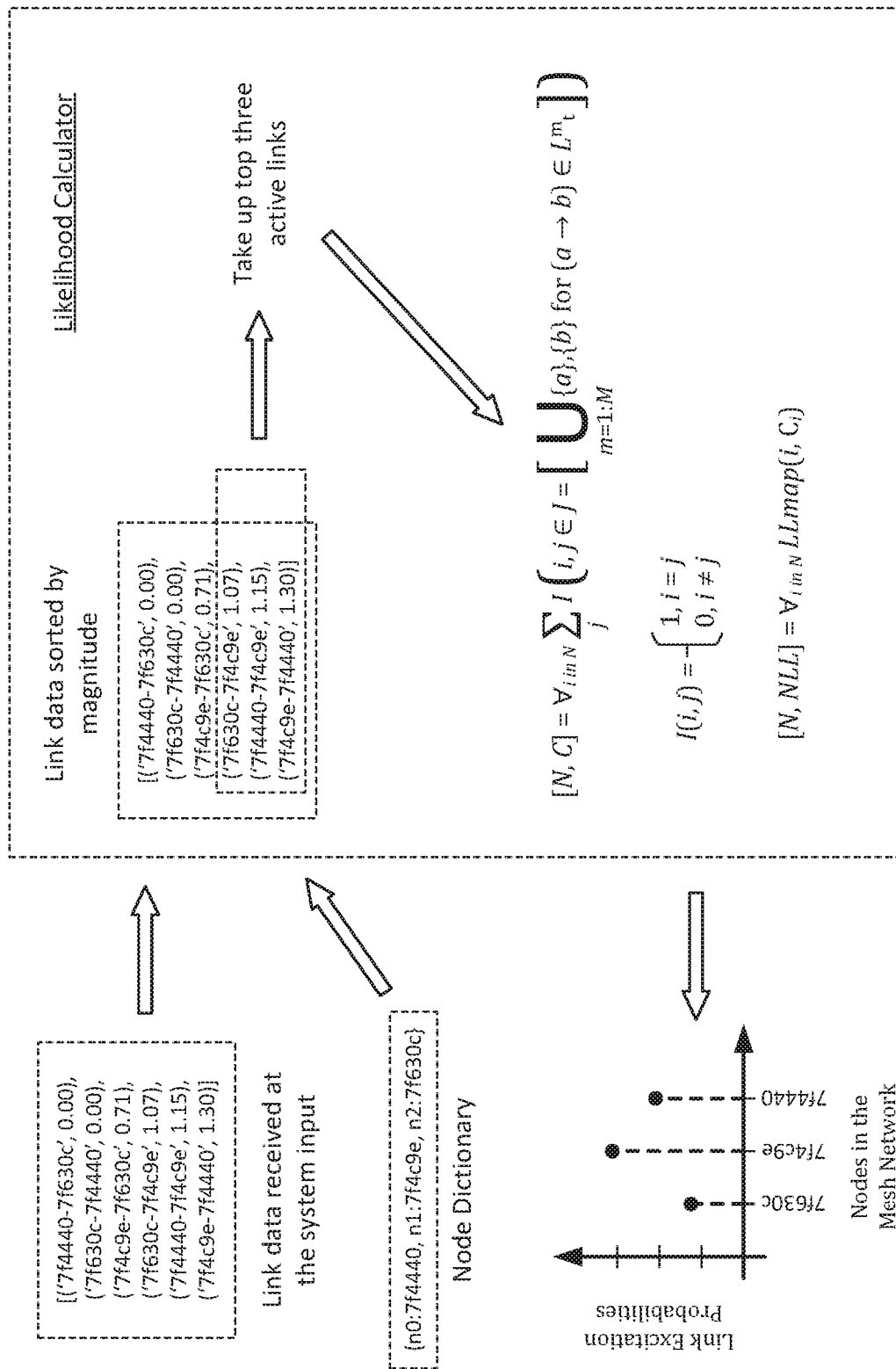
FIG. 5A is a flowchart of an example process in which a likelihood calculator generates a probability vector based on multiple wireless links.

FIG. 5A presents a flowchart of an example process in which a likelihood calculator generates a probability vector based on multiple wireless links. FIG. 5A depicts the likelihood calculator taking three wireless links into account. However, other numbers of wireless links are possible. To take multiple wireless links into account, the likelihood calculator relies on motion indicator values in addition to the highest motion indicator value. This process makes intuitive sense. If a disturbance happens near a wireless node, the disturbance is likely to affect all wireless links associated with that wireless node. The likelihood calculator may take up all the excited wireless links and examine a frequency of occurrence of a particular wireless node amongst the excited wireless links. In this instance, motion is most likely to be happening at the most common wireless node. The likelihood calculator takes the M top excited wireless links (e.g., M=3), and passes them through a mathematical function. The mathematical function splits each wireless link to create a set of tuples, then determines the frequency of each wireless node in the given set of tuples. The mathematical function also maps the resulting frequency of each wireless node to likelihood through a link likelihood map. The probability vector is then output for Bayesian update engine.

Figure 5B:
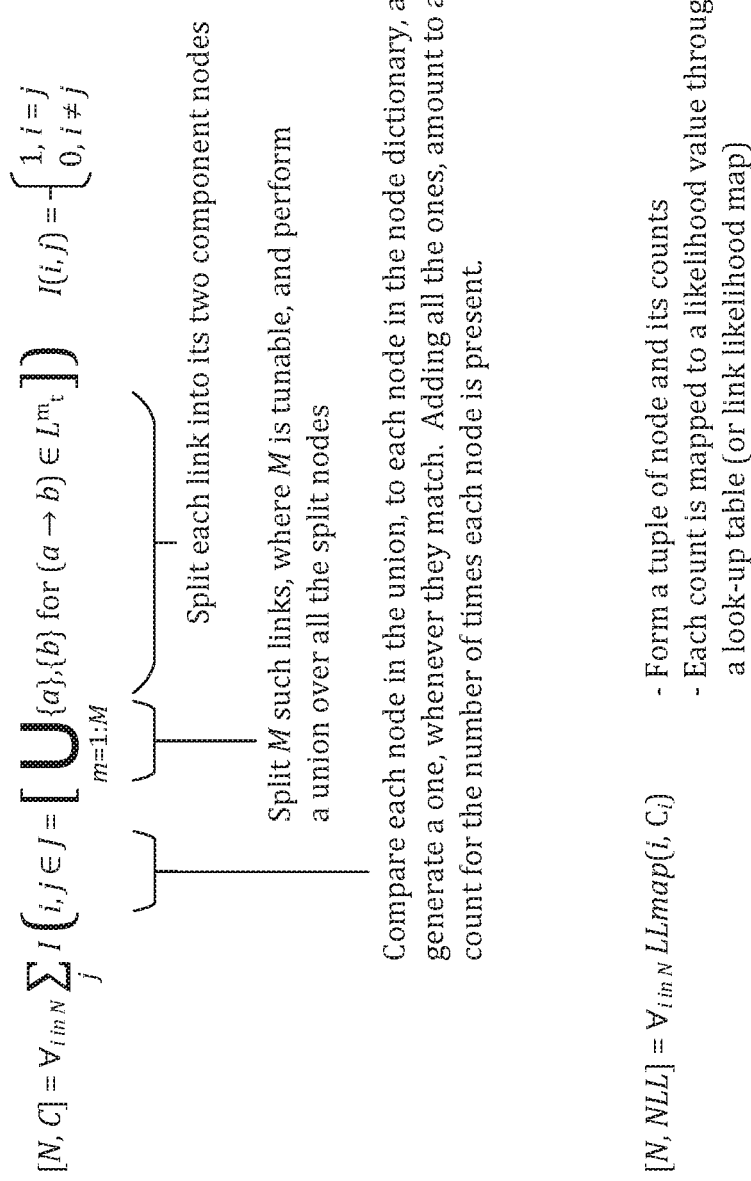
FIG. 5B is an example mathematical function for generating a probability vector using a likelihood calculator.

FIG. 5B presents an example mathematical function for generating a probability vector using a likelihood calculator. FIG. 5B shows the multi-link likelihood process utilized by the likelihood calculator in FIG. 5A, and splits and explains the example mathematical function in greater detail. A wireless link from a certain time instant is referred to as $L_t$, and the wireless link number in terms of excitation rank is given by m. The likelihood calculator takes up M excited wireless links from a wireless link vector and uses one wireless link, denoted as (a→b), to create a set of nodes {a} and {b} and perform a union of this set over all the M excited wireless links. Variable j then sweeps over this union by taking in each element and comparing it with a given element denoted by i, where i is being swept across the node dictionary. This comparison yields a one or a zero, which are summed together for all values of j in the dictionary. The summation yields a count for each wireless node present in the wireless communication network. An LLmap function receives a certain node and its respective count, and in response, outputs a likelihood value for every count. The higher the count, the higher is the likelihood for motion at a wireless node.

Now referring back to FIG. 4, the data processing apparatus also executes program instructions to pass, from the node dictionary 408 to a probability mapper/redistributor, the list of unique wireless nodes present in the wireless communication network during the time frame. The data processing apparatus may function, in part, as a probability mapper/redistributor, such as shown by block 418. As part of this operation, the data processing apparatus may receive a probability vector generated prior to the time frame, e.g., a prior probability vector. The probability mapper/redistributor 418 is operable to determine a change in wireless connectivity between time frames, such as between a prior time frame and a subsequent time frame. The change in wireless connectivity may include one or both of: [1] wireless nodes that have connected to the wireless communication network between the prior and subsequent time frames, or [2] wireless nodes that have disconnected from the wireless communication network between the prior and subsequent time frames. To determine the change in wireless connectivity, the probability mapper/redistributor 418 may compare the list of unique wireless nodes in the time frame to wireless nodes represented in the probability vector generated prior to the time frame.

The probability mapper/redistributor 418 is also operable to generate an initialization probability vector of a plurality of initialization probability vectors 420 by altering values of the prior probability vector based on the change in wireless connectivity. For example, the change in wireless connectivity may include a wireless node that has disconnected from the wireless communication network between the prior and subsequent time frames. In this case, the probability mapper/redistributor 418 may generate the initialization probability vector by apportioning values of the prior probability vector associated with the disconnected wireless node to values of wireless nodes that have remained connected to the wireless communication network. Such apportioning may occur in ratios defined by the values of the remaining wireless nodes. However, other apportioning schedules are possible. In another example, the change in wireless connectivity may include a wireless node that has connected from the wireless communication network between the prior and subsequent time frames. In this case, the probability mapper/redistributor 418 generate the initialization probability vector by adding a value to the prior probability vector for the newly-connected wireless node.

The probability mapper/redistributor 418 may be operable to generate other types of initialization probability vectors that correspond to reset states. For example, if the wireless communication network (or motion detection system) is cold-started, the probability mapper/redistributor 418 may generate an initialization probability vector by assigning equal probability values to all unique wireless nodes listed in the node dictionary 408. In another example, if the wireless communication network (or motion detection system) is warm-started, the probability mapper/redistributor 418 may generate an initialization probability vector based on probability values that correspond to a time frame when motion was last detected. In yet another example, if the wireless communication network (or motion detection system) is operational but later reset, the probability mapper/redistributor 418 may utilize the prior probability vector as the initialization probability vector. In yet another example, if a user notifies the wireless communication network (or motion detection system) that he/she is leaving a monitored residence (e.g., through a mobile software application), the probability mapper/redistributor 418 may generate an initialization probability vector with probability values biased towards wireless nodes at a point of entry (e.g., a front door).

The probability mapper/redistributor 418 passes the plurality of initialization probability vectors 420 to a multiplexor (or mux), which also receives the prior probability vector from a motion model. The data processing apparatus may function, in part, as the multiplexor, such as shown by block 422. The multiplexor 422 is operable to select the prior probability vector or one of the plurality of initialization probability vectors based on the set of motion indicator values, a configuration of the wireless communication network, or both. The selected probability vector is then passed to the Bayesian update engine, as shown in FIG. 4. In order to determine which probability vector to select, the multiplexor 422 receives a control input from a motion persistence calculator, as shown by block 424. The motion persistence calculator 424 receives the data structure 402, which includes the set of motion indicator values, and also receives a configuration of the wireless communication network 426. Based on these inputs, the motion persistence calculator 424 generates the control signal, which when received by the multiplexor 422, selects which of the prior probability vector or one of the plurality of initialization probability vectors is passed to the Bayesian update engine. If motion is continuously detected by the wireless communication network (or motion detection system), the motion persistence calculator 424 may keep passing a prior probability vector through the multiplexor 422. In contrast, if motion is detected after a period of absence, the motion persistence calculator 424 may pass an initialization probability vector through the multiplexor 422 that corresponds to a reset state. The data processing apparatus may also function, in part, as the motion persistence calculator 424.

In some implementations, the data processing apparatus uses the selected probability vector and a set of motion indicator values associated with a second subsequent time frame to identify a location associated with motion that occurred during the subsequent time frame. In particular, executes program instructions to generate, from a first probability vector received from the likelihood calculator 416 and a second probability vector received from the multiplexor 422, a third probability vector that includes third values for each wireless node. In particular, the Bayesian update engine generates the third probability vector, as shown by block 428. The third values of the third probability vector represent probabilities of motion at the respective wireless nodes during the time frame.

In some variations, the second probability vector is represented by a probability vector, $P(N_i)$, that includes probability values (or second values) representing a probability of motion at a wireless node, $N_i$. The probability of motion at wireless node, $N_i$, for $P(N_i)$ is independent of link activity along any of wireless links, $L_j$, and may also be independent of other factors. For example, and with reference to FIG. 3, the program instructions may cause the data processing apparatus to define $P(N_i)$ according to $P(N_i) = \{P(0), P(1), P(2)\}$. Here, $P(N_i)$ has probability values of $P(0)$, $P(1)$, and $P(2)$, which correspond to the probability of motion at (or proximate to) wireless nodes 0, 1, and 2, respectively.

In some variations, the third probability vector is represented by $P(N_i|L_j)$, where $N_i$ corresponds to the unique node identifier and $L_1$ corresponds to the unique link identifier. The third probability vector, $P(N_i|L_j)$, includes third values that represent a probability of motion at wireless node, $N_i$, given link activity along wireless link, $L_j$. For example, if $L_j$ corresponds to wireless link 1 in the wireless communication network 300 of FIG. 3, the respective third values may then be represented by $P(0|1)$, $P(1|1)$, and $P(2|1)$, where $P(N_i|1) = \{P(0|1), P(1|1), P(2|1)\}$. Here, $P(0|1)$ corresponds to a probability that link activity along wireless link 1 results from motion at wireless node 0, $P(1|1)$ corresponds to a probability that link activity along wireless link 1 results from motion at wireless node 1, and $P(2|1)$ corresponds to a probability that link activity along wireless link 1 results from motion at wireless node 2.

The third probability vector, $P(N_i|L_j)$, may be determined by the Bayesian update engine 428 according to Eq. (1):

$$P(N_i \mid L_j) = \frac{P(L_j \mid N_i) \cdot P(N_i)}{\sum_i P(L_j \mid N_i) P(N_i)} \quad (1)$$

where $P(L_j|N_i)$ and $P(N_i)$ are as described above for, respectively, the first probability vector from the likelihood calculator 416 and the second probability vector from the multiplexor 422. Eq. (1) may allow the wireless communication network 300 (or data processing apparatus) to determine the location of detected motion using Bayesian statistics. For example, if in the wireless communication network 300 of FIG. 3, the subset of wireless links includes only wireless link 1 and $P(1|N_i) = \{1, 0.2, 0.9\}$ based on the link likelihood map, the program instructions may then cause the data processing apparatus to calculate the third probability vector, $P(N_i|1)$, according to:

$$P(N_i \mid 1) = \frac{P(1 \mid N_i) \cdot P(N_i)}{\sum_i P(1 \mid N_i) P(N_i)} = \frac{\{1.0 \cdot 0.333, \, 0.2 \cdot 0.333, \, 0.9 \cdot 0.333\}}{(1.0 \cdot 0.333) + (0.2 \cdot 0.333) + (0.9 \cdot 0.333)}$$

Such calculation results in $P(N_i|1) = \{0.476, 0.095, 0.429\}$, with the third values summing to unity, i.e., $0.476 + 0.095 + 0.429 = 1$. $P(N_i|1)$ may therefore represent a probability distribution normalized to unity. In $P(N_i|1)$, $P(0|1)$ corresponds to the largest of the third values, indicating that motion detected by the wireless communication network 300 along wireless link 1 has the highest probability of being located at (or proximate to) wireless node 0. Based on this value of $P(0|1)$, the program instructions may cause the data processing apparatus to look up the MAC address value of wireless node 0, and when found, output the result (e.g., output 7f4440).

In some implementations, the data processing apparatus performs an iterative process for sequential time frames. For example, the data processing apparatus may repeat the operations, over multiple iterations for respective time frames, of obtaining the set of motion indicator values associated with a subsequent time frame, identifying the subset of wireless links based on a magnitude of their associated motion indicator values relative to other motion indicator values in the set of motion indicator values, generating the count values for the wireless nodes connected to the wireless communication network during the subsequent time frame, generating the first probability vector based on the count values and including values for the connected wireless nodes. In some implementations, the repeated operations include obtaining a set of motion indicator values associated with a prior time frame, generating a prior probability vector associated with the prior time frame, generating a second probability vector by selecting the prior probability vector or one of the plurality of initialization probability vectors to.

In some implementations, the repeated operations may include generating a third probability vector based on the first values of the first probability vector and the second values of the second probability vector; identifying a wireless communication device associated with the highest of the third values; and identifying, by operation of a data processing apparatus, a location associated with the identified wireless communication device as a location of the motion detected from the wireless signals exchanged during the subsequent time frame.

Figure 6:
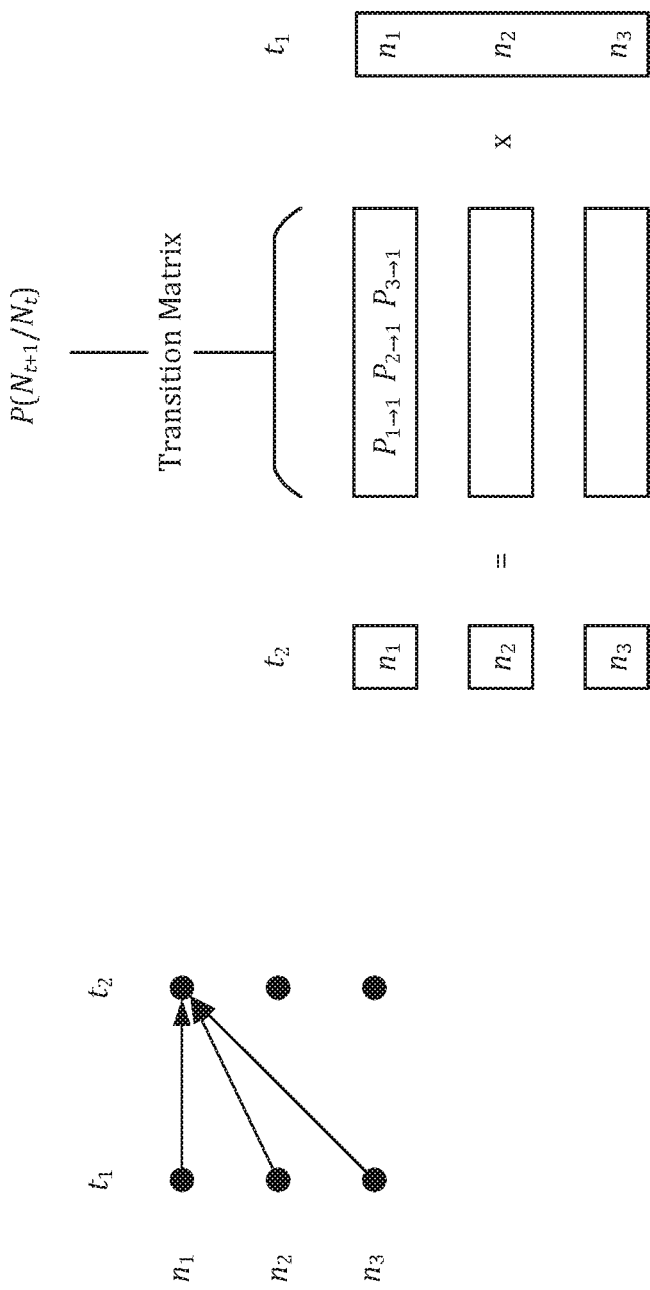
FIG. 6 is a schematic diagram of an example motion model using a trellis representation for three wireless nodes.

An output of the Bayesian update engine 428 may be fed into the motion model to generate the prior probability vector (or second probability vector), which is passed to the probability mapper/redistributor 418 and the multiplexor 422. The data processing apparatus may function, in part, as the motion model, as shown by block 430. The motion model 430 may operate analogous to calculating probabilities on a trellis. FIG. 6 presents a schematic diagram of an example motion model using a trellis representation for three wireless nodes. At every time instant t, motion may exist at any of the available wireless nodes. From time t to time t+1—shown in FIG. 6 as $t_1$ and $t_2$, respectively—motion can either remain at the same wireless node, or transition to any of the other wireless nodes. In order to determine motion at time step t+1, the probabilities of motion existing on any of the wireless nodes in time step t are aggregated, which may include a matrix vector calculation. Probabilities that motion now happens at $n_1$ in time step t+1 is given by the possibilities of motion happening at $n_1$ in the past and staying at $n_1$, happening at $n_2$ in the past and moving to $n_1$, or happening at $n_3$ in the past and moving to $n_1$. In other words, the motion at $n_1$ at time step t+1 can be represented by a dot product. The entire operation for all three nodes at any time can be represented by a matrix vector calculation as shown. Each entry of the matrix is a transition probability of motion, transitioning from happening at $N_x$ to $N_y$.

Figure 7:
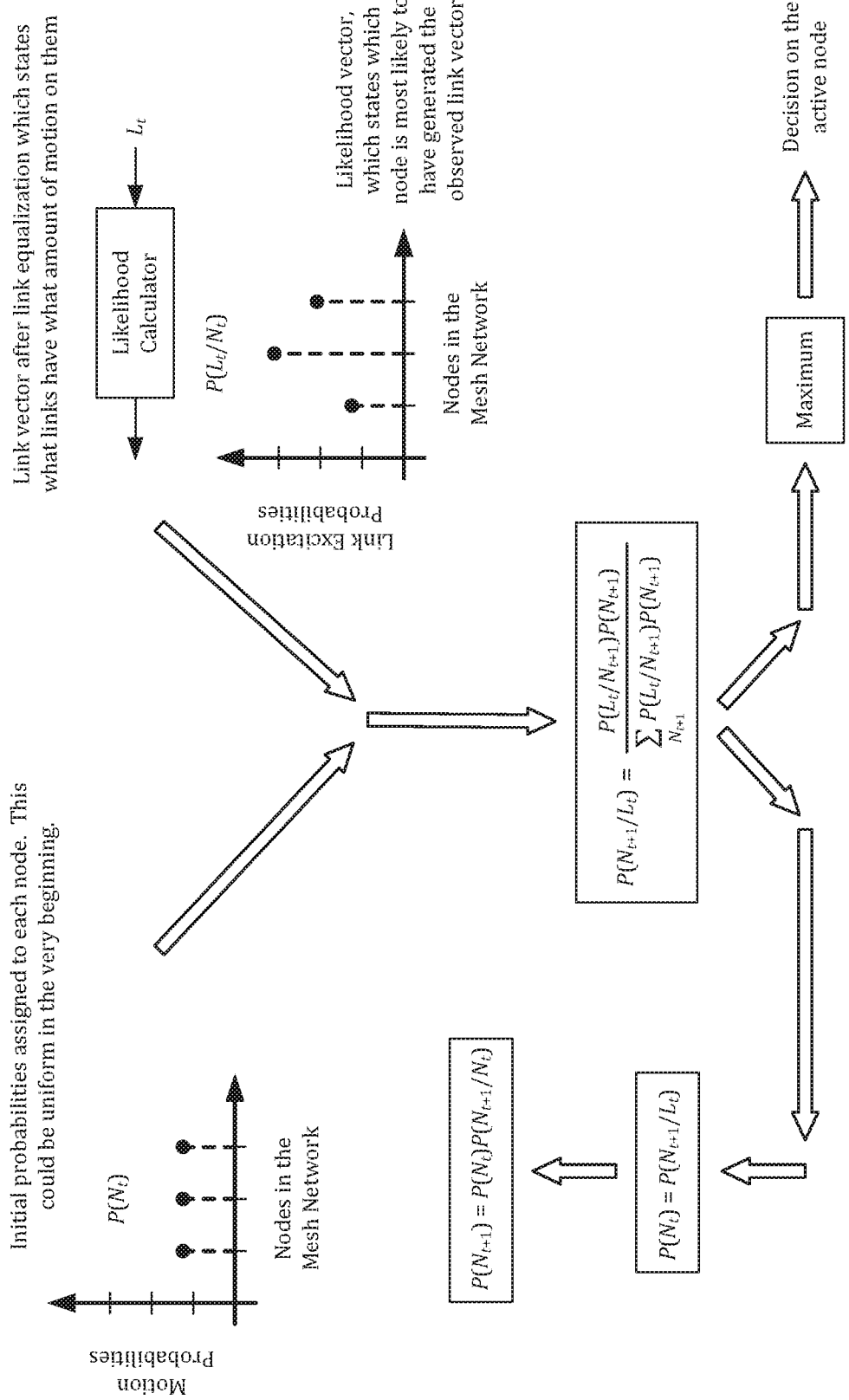
FIG. 7 is a schematic diagram of an example flow of probabilities in determining a location of motion detected by three wireless links in a wireless communication network.

FIG. 7 presents a schematic diagram of an example flow of probabilities in determining a location of motion detected by three wireless links in a wireless communication network. On the leftmost side is an initial probability vector which assigns equal probabilities of motion to all wireless nodes in the wireless communication network. In the graph inset in the upper left, each pulse on the axis is to be read as a probability of motion happening at node $N_x$ on the x-axis. On the rightmost side, motion indicator values are received, which specifying an amount of excitation on a wireless link. These values are converted into a likelihood function, which determines how likely each wireless node is to have triggered an observed link behavior. In the graph inset in the middle right, a link-excitation likelihood graph presents a plot of a likelihood vector over the x-axis and for all possible wireless nodes. Using Bayesian formulation, the likelihood vector and the initial probability vector are multiplied and a resulting product is divided by a normalizing constant obtained by performing marginalization over all wireless nodes. This calculation provides a probability of motion at a wireless node given the link information at time step t+1. This probability is used to form a decision on where the motion is most likely to be happening. The output probabilities are assigned to a node-motion probability vector as new probabilities, and then propagated through the motion model, in preparation for the next iteration of the loop. The job of the motion model is to propagate these probabilities into the next time step, based on the information of what is a transition probability of making a transition from $N_x$ to $N_y$ at any time instant.

In some implementations, the wireless communication network may include a network topology, a motion topology, or both. The network topology is defined by wireless links in the wireless communication network that are active in a time frame. Such activity may be represented by an exchange of data between two wireless nodes associated with an active wireless link in the time frame. As such, the network topology includes the wireless nodes associated with the active wireless links. By comparison, the motion topology is defined by active wireless links in the network topology that become excited by motion of an object in the time frame. The motion topology includes the wireless nodes associated with the excited wireless links and a connected state of those wireless nodes. The connected state is defined by a number of wireless nodes connected to a wireless node of interest, such as through respective wireless communication channels. Examples of the connected state include singly-connected, doubly-connected, triply-connected, and so forth.

Figure 8:
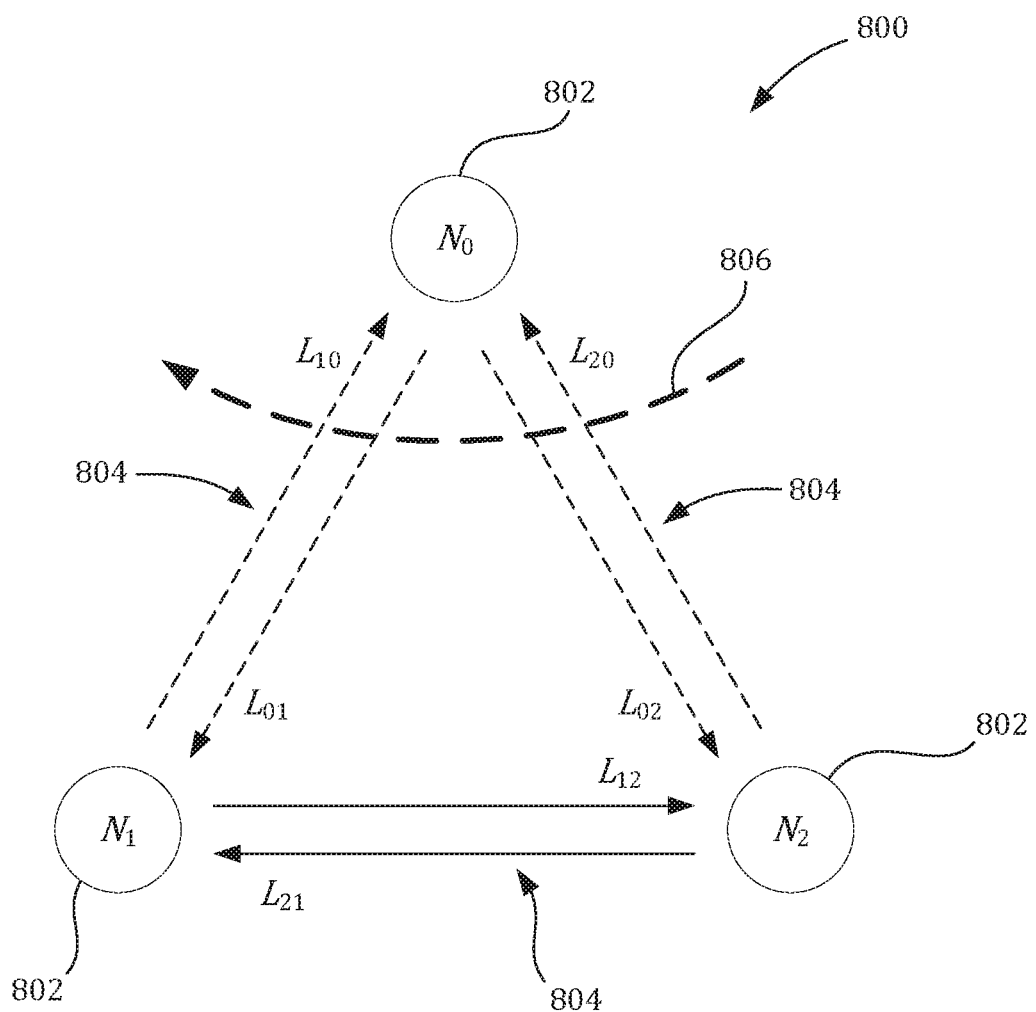
FIG. 8 is a schematic diagram of the example wireless communication network of FIG. 3, but in which the motion of an object excites four wireless links.

For example, FIG. 8 presents a schematic diagram of the example wireless communication network 300 of FIG. 3, but in which the motion of an object excites four wireless links. The motion of the object may occur during a time frame. Features common to both FIG. 3 and FIG. 8 are related via coordinated numerals that differ in increment by five hundred. The network topology of the example wireless communication network 800 is defined by wireless nodes $N_0$, $N_1$, and $N_2$ and wireless links $L_{01}$, $L_{10}$, $L_{02}$, $L_{20}$, $L_{12}$ and $L_{21}$. A dashed arrow 806 indicates motion of the object near wireless node $N_0$, which excites wireless links $L_{01}$, $L_{10}$, $L_{02}$, and $L_{20}$. The excited state of wireless links $L_{01}$, $L_{10}$, $L_{02}$, and $L_{20}$ is represented in FIG. 8 by dashed arrows.

The excited wireless links are part of wireless communication channels 804 between wireless node $N_0$ and wireless nodes $N_1$ and $N_2$ and serve as a basis to define a motion topology. In particular, the motion topology of the example wireless communication network 800 is defined by wireless nodes $N_0$, $N_1$, and $N_2$ and excited wireless links $L_{01}$, $L_{10}$, $L_{02}$, and $L_{20}$. The motion topology does not include wireless links $L_{12}$ and $L_{21}$, which are not excited by the motion of the object. Two wireless communication channels 804 are present in the motion topology, i.e., one extending between wireless nodes $N_0$ and $N_1$ and one extending between wireless nodes $N_1$ and $N_2$. Wireless node $N_0$ is thus wirelessly connected to two other nodes and has a connected state that is doubly-connected. Similarly, wireless nodes $N_1$ and $N_2$ are each connected to one other node and have respective connected states that are singly-connected (in the motion topology). Although FIG. 8 is presented in the context of a single time frame, one or both of the network and motion topologies of the example communication network 800 can change over multiple iterations of the time frame.

In some variations, the wireless communication network 800 corresponds to a wireless mesh network and the wireless nodes $N_0$, $N_1$, and $N_2$ correspond to access point (AP) nodes of the wireless mesh network. The access point nodes may generate motion-sensing data based on wireless signals transmitted between respective pairs of the access point nodes, such as along wireless links $L_{01}$, $L_{10}$, $L_{02}$, $L_{20}$, $L_{12}$ and $L_{21}$ of the wireless communication channels 804. The motion-sensing data may be generated in response to motion of an object in a space traversed by the wireless signals (e.g., as indicated by dashed arrow 806). However, the motion-sensing data may also be generated in the absence such motion.

Figure 9:
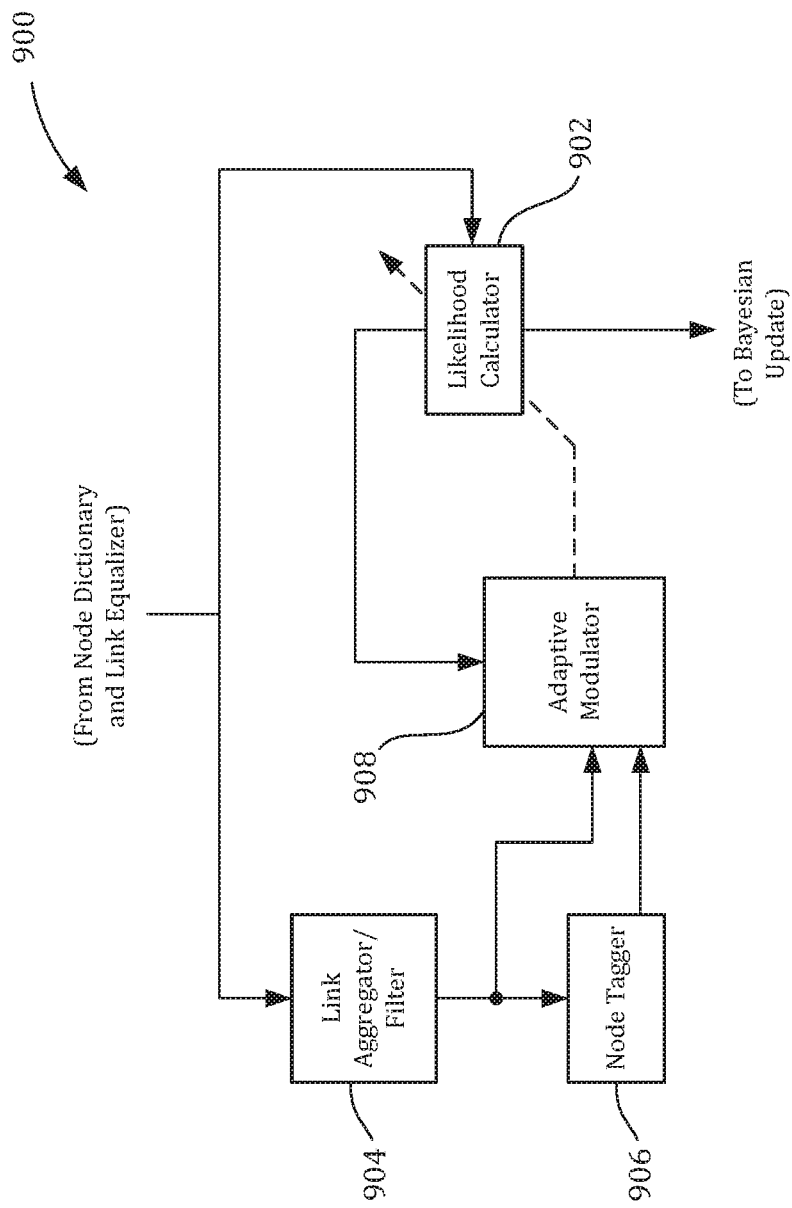
FIG. 9 is a flowchart of an example process for determining a location of motion based on a motion topology of a wireless communication network.

Now referring back to FIG. 4, the likelihood calculator 416 generates probability vectors for the Bayesian update engine 428 based on count values for each wireless node connected to the wireless communication network during the time frame. FIG. 9 presents a flowchart 900 of an example process for determining a location of motion based on a motion topology of a wireless communication network. The flowchart 900 may represent an optional portion of the flowchart 400 described in relation to FIG. 4 and may correspond to program instructions to be executed by a data processing apparatus of the wireless communication network. At a start of the example process, the data processing apparatus may receive from a node dictionary (e.g., the node dictionary 408 of FIG. 4) a list of unique wireless nodes present in the wireless communication network during a time frame. The data processing apparatus may also receive from a link equalizer (e.g., the link equalizer 414 of FIG. 4) a list of wireless links identified as present in the wireless communication network during the time frame. The list of identified wireless links includes normalized motion indicator values for each wireless link. The list of unique wireless nodes and the list of identified wireless links may be stored in a database and used to define a network topology for the wireless communication network.

The data processing apparatus may function in part as a likelihood calculator, as shown in block 902. In this capacity, the data processing apparatus may generate a probability vector in response to receiving the list of unique wireless nodes and the list of identified wireless links. The probability vector is based on count values for each unique wireless node in the list of unique wireless nodes, as described previously in relation to the likelihood calculator 414 of FIG. 4. The data processing apparatus may also function in part as a link aggregator/filter, as shown in block 904. The link aggregator/filter 904 receives the list of unique wireless nodes and the list of identified wireless links, and using the latter, determines which wireless links are being excited by motion during the time frame. In some instances, the link aggregator/filter 904 makes this determination using a minimum excitation (or disturbance) threshold. The link aggregator/filter 904 then compiles a list of excited wireless links.

The data processing apparatus may additionally function in part as the node tagger, as shown in block 906. The node tagger 906 receives the list of excited wireless links from the link aggregator/filter 904, and for each excited wireless link in the list, determines the wireless nodes defining the excited wireless link. For each unique wireless node so-determined, the node tagger 906 generates a probability vector that includes a probability value for each possible connected state of the determined wireless node. Examples of possible connected states include singly-connected, doubly-connected, triply-connected, and so forth. The node tagger 906 then assigns a "tag" to each determined wireless node indicating the connected state of the determined wireless node during the time frame. In doing so, the node tagger 906 may generate, for the time frame, a list of determined wireless nodes and their respective "tags". In many instances, the "tag" assigned to a determined wireless node corresponds to the connected state having the highest probability in the probability vector.

In some implementations, after the "tags" have been assigned, the node tagger 906 resolves a motion topology (or motion-sensing topology) of the wireless communication network for the time frame. To do so, the node tagger 906 may use the "tag" assigned to each determined wireless node and the network topology of the wireless communication network. The motion topology may be stored in a motion topology database that includes an identity of the excited wireless links, an identity of the determined wireless nodes, and the "tag" of each determined wireless node.

In some implementations, the node tagger 906 may repeat the operations of determining wireless nodes, generating probability vectors, and assigning "tags" to update the "tag" associated with each determined wireless node. Such repetition may allow the node tagger 906 to generate and maintain a "tag" database that includes all wireless nodes in the wireless communication network, their respective probability vectors, and their respective "tags". The "tags" in the "tag" database may be updated as the probability vectors change, e.g., as subsets of wireless links are excited over successive time frames in response to motion of an object.

The node tagger 906 passes the list of the determined wireless nodes and their respective "tags" to an adaptive modulator, which is shown by block 908. The adaptive modulator 908 also receives a count-value data structure from the likelihood calculator 902. The count-value data structure associates each wireless node connected to the wireless communication network during the time frame with a count value. The count value indicates how many excited wireless links are defined by the wireless node. The adaptive modulator 908 then compares the count value of a determined wireless node with a threshold count value associated with the "tag" assigned to the wireless node. If the count value is less than the threshold count value, the wireless node is removed from the count-value data structure. The threshold count value may represent a minimum number of excited wireless links necessary to consider a connected state as participating in the detection of motion. The adaptive modulator 908 repeats this comparison for each determined wireless node to generate a modified count-value data structure. The modified count-value data structure is then passed back to the likelihood calculator 908, which uses the modified count-value data structure to generate probability vectors for a Bayesian update engine (e.g., the Bayesian update engine 428 of FIG. 4). In this manner, the adaptive modulator 908 updates the count-value data structure based on the motion topology (or motion-sensing topology) of the wireless communication network. In many implementations, the count-value data structure is updated adaptively over successive time frames.

In some implementations, the data processing apparatus executes program instructions to modify the count-value data structure based on a motion topology in a variable timeframe. The variable timeframe may be altered in duration to accommodate a length of time that motion takes to excite wireless links in a wireless communication network. For example, if the wireless nodes $N_1$ and $N_2$ of FIG. 8 are separated by a large distance, motion 806 near wireless node $N_0$ may take a longer time to move from wireless links $L_{20}$ and $L_{02}$ to wireless links $L_{01}$ and $L_{10}$ (e.g., due to a larger angular distance). If the time frame is not increased in duration to encompass the longer time, the motion topology is based only on wireless links $L_{20}$ and $L_{02}$ and the probability vector from the likelihood calculator inaccurately weights a location of the motion 806 equally between wireless nodes $N_0$ and $N_2$. Increasing the time frame to encompass the longer time allows the probability vector to more accurately weight the location of motion 806 towards wireless node $N_0$.

Figure 10:
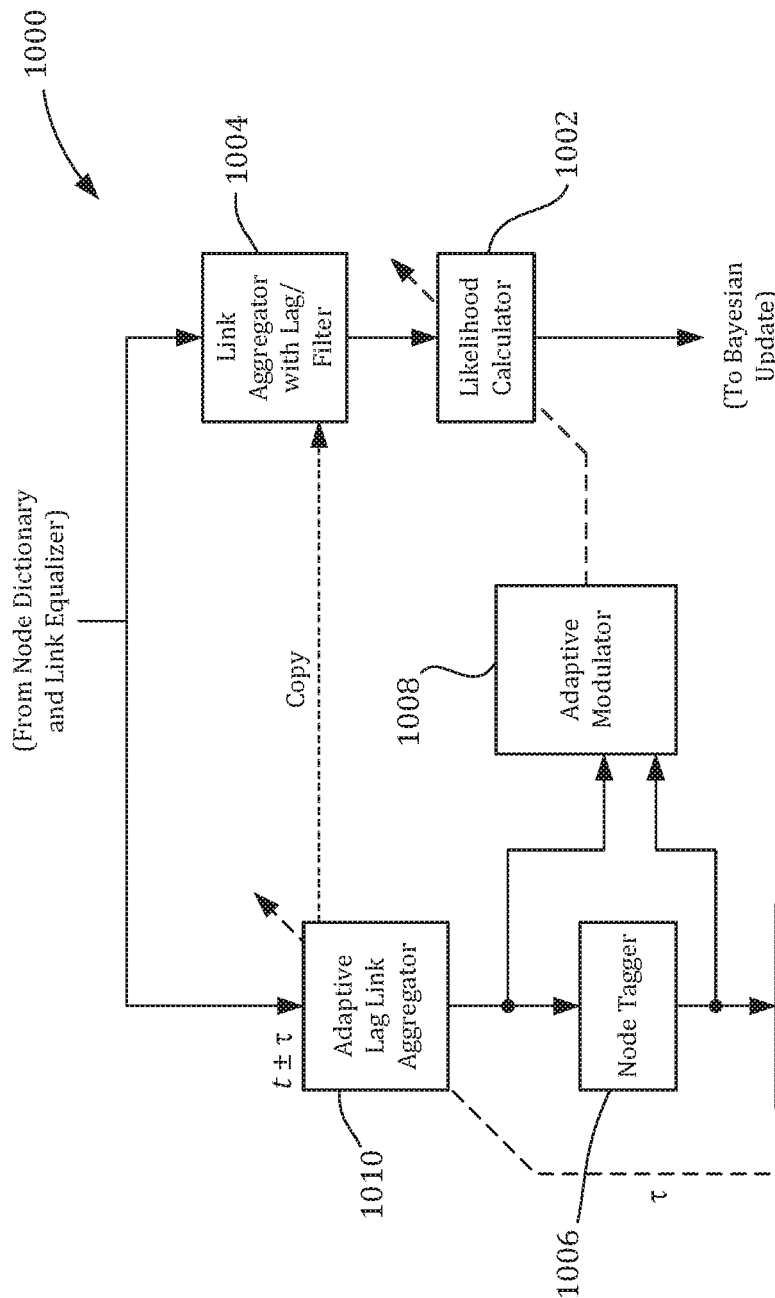
FIG. 10 is a flowchart of an example process for determining a location of motion using a motion topology based on a variable timeframe.

FIG. 10 presents a flowchart 1000 of an example process for determining a location of motion using a motion topology based on a variable timeframe. The flowchart 1000 may represent an optional portion of the flowchart 400 described in relation to FIG. 4 and may correspond to program instructions to be executed by a data processing apparatus of a wireless communication network. At a start of the example process, the data processing apparatus may receive from a node dictionary (e.g., the node dictionary 408 of FIG. 4) a list of unique wireless nodes present in the wireless communication network during a time frame. The data processing apparatus may also receive from a link equalizer (e.g., the link equalizer 414 of FIG. 4) a list of wireless links identified as present in the wireless communication network during the time frame. The list of identified wireless links includes normalized motion indicator values for each wireless link. The list of unique wireless nodes and the list of identified wireless links may be stored in a database and used to define a network topology for the wireless communication network.

The flowchart 1000 includes features analogous to those already described in relation to the flowchart 900 of FIG. 9. However, the flowchart 900 includes additional features (or program instructions) that allow the data processing apparatus to determine the location of motion using the motion topology based on the variable timeframe. In particular, the data processing apparatus may execute program instructions to function, in part, as an adaptive lag link aggregator, as shown in block 1010. The adaptive lag link aggregator 1010 receives the list of unique wireless nodes and the list of identified wireless links, and using the latter, determines which wireless links are being excited by motion during the variable timeframe, t±τ. In doing so, the adaptive lag link aggregator 1010 generates a list of excited wireless links that includes one instance of an excited wireless link for each time the excited wireless link is excited in the variable timeframe. If a number of instances exceeds a threshold number, the number of instances is set equal to the threshold number.

The adaptive lag link aggregator 1010 also determines a count value for each unique wireless node based on the list of excited wireless links. The count value indicates how many excited wireless links—including instances thereof—are defined by the unique wireless node. Using the count values, the adaptive lag link aggregator 1010 generates an adapted count-value data structure that associates each unique wireless node with a count value. The adaptive lag link aggregator 1010 passes the adapted count-value data structure to a link aggregator with lag/filter, as shown in block 1004. The adaptive lag link aggregator 1010 also passes the list of excited wireless links to a node tagger, as shown in block 1006. The link aggregator with lag/filter 1004 and the node tagger 1006 may operate analogously to the link aggregator/filter 904 and node tagger 906 described in relation to FIG. 9.

In many implementations, the adaptive lag link aggregator 1010 builds a delay line. The delay line not only keeps track of the instantaneous excited link vector, but also a number (N) of last excited link vectors. The delay line allows the data processing apparatus to capture a pair of wireless links that are not triggered or excited together (e.g., due to a pathology) and enable them to be aggregated in the same time frame. Such aggregation allows wireless links belonging to one wireless node to appear in the same buffer while simultaneously pointing to the "true" motion topology of a wireless node. The aggregation may also assist the node tagger 1006 in accurately assigning "tags". Depending on circumstance, the aggregation can occur using a number of different processes. For example, the adaptive lag link aggregator 1010 can determine all unique wireless links in the N element buffer, and then form an output based on all of the unique wireless links. In another example, the adaptive lag link aggregator 1010 can use the three most-often excited wireless links in the buffer. Other examples of process are possible. However, in general, the aggregation process can be employed to feed more nuanced versions of excited wireless links to the node tagger 1006.

The delay line may also be applicable for calculating a likelihood, e.g., to allow the motion to excite all relevant wireless links connected to a wireless node. The likelihood calculator 1002 also needs the frequency of wireless nodes appearing in the excited wireless links in order to compute the likelihood of motion being at the wireless node. This aggregation can be performed in the same way as described above. Alternatively, a different criterion may be selected, though fashioned along the same lines. In FIG. 10, the adaptive lag link aggregator 1010 and the link aggregator with lag filter 1004 are shown as two different boxes, where one is being copied into the other. These functional units could be mirror images of each other, or they could be slightly different, depending upon as optimization selected by a design (e.g., in program instructions). For example, in the later alternative, such as with the link aggregator with lag filter 1004, a designer can take the two instances of a wireless link's excitation for aggregation, rather than unique instances only. If a subset of wireless links is aggregated, the aggregation can accentuate the likelihood function (or frequency of wireless nodes appearing) towards one or more particular wireless nodes in the wireless communication network. Such bias can have favorable convergence outcomes for the Bayesian inferencing conducted by a Bayesian update engine.

The data processing apparatus may also function in part as a topological inconsistency calculator, as shown in block 1012. The topological inconsistency calculator 1012 tracks a duration of the variable timeframe over time to remove inconsistencies between the motion and network topologies of the wireless communication network. In particular, the topological inconsistency calculator 1012 compares the motion topology with the network topology during the variable timeframe to determine a connectivity difference. The motion topology is received from the node tagger 1006, and in some instances, includes a motion topology database. If the connectivity difference is greater than a threshold difference, the topological inconsistency calculator 1012 sends a signal to the adaptive lag link aggregator 1010 to increase the duration of the variable timeframe. The signal may specify an increment value, which is represented in FIG. 10 as $\tau$. In many instances, the topological inconsistency calculator 1012 repeatedly sends signals to the adaptive lag link aggregator 1010 to iteratively increase the duration of the variable timeframe (e.g., iteratively increase the magnitude of $\tau$ until the connectivity difference is equal to or less than the threshold difference. The duration of the variable timeframe may have a maximum duration, at which, the topological inconsistency calculator 1012 stops sending signals to the adaptive lag link aggregator 1010. In some implementations, if the connectivity difference is equal to or less than the threshold difference, the topological inconsistency calculator 1012 sends a signal to the adaptive lag link aggregator 1010 to decrease the duration of the variable timeframe. The signal may specify a decrement value (e.g., x). It will be appreciated that, by controlling the variable timeframe used by the adaptive lag link aggregator 1010, the topological inconsistency calculator 1012 allows the data processing apparatus to adaptively adjust to a length of time that motion takes to excite wireless links in the wireless communication network.

In many variations, the connectivity difference may be determined using a metric (e.g., a probability value) based on a connected state of a wireless nodes in the motion and network topologies. For example, the connectivity difference may be determined based on a probability of a wireless node being in a doubly-connected state in the motion topology versus a probability of the wireless node being in a doubly-connected state in the network topology. The latter value may be calculated from the observed link vector available at the input of the flowchart 1000. The observed link vector indicates which of the wireless links in the wireless communication network are reporting their motion indicators. If a wireless node appears in a doubly-connected state often in this reported vector—e.g., all four wireless links are connected to the wireless node are present all the time—then the wireless node has a high probability of being doubly-connected in the network topology. In contrast, the probability of the wireless node being doubly-connected in the motion topology is based on the excited wireless links, not the reported wireless links. If a wireless node is connected to all four wireless links, and all of those four wireless links get excited simultaneously and often, the wireless node has a high probability of being doubly-connected in the motion topology.

Figure 11:
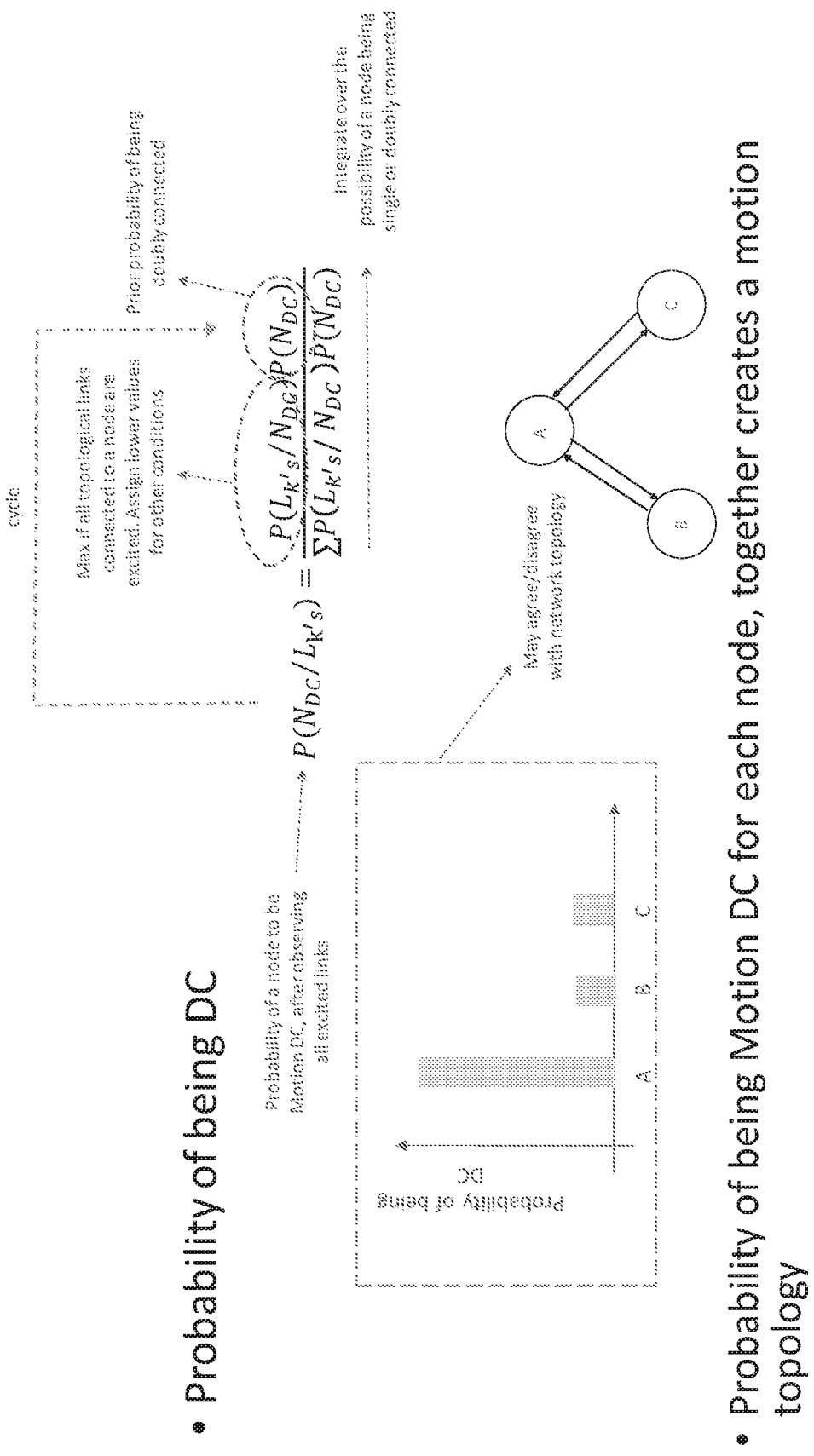
FIG. 11 is an example formula, with an example graph, for determining a probability of a wireless node being in a doubly-connected state in a motion topology.

FIG. 11 presents an example formula, with graph, for determining a probability of a wireless node being in a doubly-connected state in a motion topology. The example formula corresponds to a calculation showing how a "tag" for a wireless node is populated. Such population is based on how many excited wireless links are perturbed during a motion event associated with the wireless node. An example metric may be associated with this formula, and more specifically, a ratio calculated by divide a first probability ($Pr_1$) with a second probability ($Pr_2$), i.e., $Pr_1/Pr_2$. The first probability represents the probability of a wireless node being doubly-connected in a motion topology, the second probability represents the probability of the wireless node being doubly-connected in a network topology. The example metric can be determined and aggregated for all wireless nodes in a wireless communication network, such as through either multiplying for all wireless nodes or adding for all wireless nodes. If this metric is equal to one, the first and second probabilities agree, and the topological inconsistency calculator 1012 is does not need to increase a duration of the variable timeframe. (Or alternatively, other processes are not needed to align them.) If the metric is less than one, first probability is lower and needs to be boosted to align the two probabilities (e.g., increasing the duration of the variable timeframe).

In some implementations, a method for determining a location of motion includes obtaining motion-sensing data from access point (AP) nodes of a wireless mesh network. The motion-sensing data is based on wireless signals transmitted between respective pairs of the AP nodes. In some instances, the motion-sensing data includes motion indicator values, which may be computed from channel information derived from the wireless signals. However, the motion-sensing data may include other types of data, such as a list of unique wireless nodes during a time frame and a list of wireless links identified as present in the wireless mesh network during the time frame.

The method also includes identifying a motion-sensing topology (or motion topology) of the wireless mesh network. The motion-sensing topology is identified based on tags assigned to respective AP nodes. Each tag indicates a connected state of a respective AP node. The method additionally includes generating a probability vector based on the motion-sensing data and the motion-sensing topology. The probability vector includes values that represent probabilities of motion of an object at respective AP nodes. In many instances, generation of the probability occurs by operation of the data processing apparatus, which executes program instructions corresponding to one or more of the flowcharts depicted in FIGS. 4, 9, and 10. A location of the motion of the object is determined based on the probability vector. In many implementations, the method includes repeating the operations, over multiple iterations for respective time frames, of obtaining motion-sensing data, identifying a motion-sensing topology, generating a probability vector, and determining a location of the motion.

In some implementations, generating the probability vector includes generating a count-value data structure based on the motion-sensing data. The count-value data structure includes count values for respective AP. Each count value indicates a number of wireless links defined by a respective AP node that were, according to the motion-sensing data, excited by motion. Generating the probability vector also includes modifying the count-value data structure based on the motion-sensing topology and generating the probability vector based on the modified count-value data structure. In further implementations, identifying the motion-sensing topology includes identifying, based on the motion-sensing data, the wireless links excited by motion and generating state probability vectors for the respective AP nodes. Each state probability vector includes values for connected states of a respective AP node, the value for each connected state representing a probability of the AP node being in the connected state. Identifying the motion-sensing topology also includes assigning the tags to the AP nodes based on the respective state probability vectors.

The values of the state probability vectors may include a first probability value and a second probability value. For example, the first probability value may represent a probability that an AP node is in a singly-connected state, and the second probability vector may represent a probability that the AP node is in a doubly-connected state. The values of the state probability vector may also include a third probability value representing a probability that the AP node is in a triply-connected state. Other probability values and corresponding connected states are possible. In many implementations, the tag assigned to each respective AP node indicates a connected state associated with a highest probability value in the state probability vector for the respective node.

In implementations where generating probability vector includes modifying the count-value data structure, such modification may include comparing the count value for a first AP node with a threshold count value and removing the first AP node from the count-value data structure if the count value is less than the threshold count value. The threshold count value is associated with the tag assigned to the first AP node and may represent a minimum number of excited wireless links necessary to consider a connected state as participating in the detection of motion.

In implementations where generating probability vector includes generating the count-value data structure, such generation may include generating a list of wireless links in the wireless mesh network that were, according to the motion-sensing data, excited by motion. The generation may also include generating a list of the AP nodes that includes an instance of an AP node for each instance, in the list of wireless links, a wireless link is defined by the AP node. The generation may additionally include setting the count value for the respective AP nodes equal to a number of times the respective AP node appears in the list of AP nodes.

In some implementations, identifying the motion-sensing topology includes identifying a difference between a first estimated motion-sensing topology and a network topology based on data collected over a first time duration. Identifying the motion-sensing topology also includes identifying a match between a second estimated motion-sensing topology and the network topology based on data collected over a second, longer time duration. The second estimated motion-sensing topology is then selected as the motion-sensing topology.

In some implementations, the wireless mesh network includes one or more leaf nodes in addition to the AP nodes. In these implementations, determining the location of the motion includes identifying one of the AP nodes or one of the leaf nodes as the location of the motion. In some implementations, the motion-sensing data is based on wireless signals transmitted between the respective pairs of the AP nodes during a first time frame, and the probability vector includes a first probability vector representing the first time frame. In such implementations, determining the location of the motion includes using a Bayesian calculator to determine the location of the motion based on the first probability vector and a prior probability vector representing a prior time frame.

The aforementioned methods and their variations may be implemented using a system that includes the wireless mesh network and its AP nodes (or leaf nodes, if present), one or more processors, and memory storing instructions that, when executed by the one or more processors, causes the system to perform operations of the methods and their variations. The aforementioned methods and their variations may also be stored as instructions on a non-transitory computer-readable medium. The instructions, when executed by a data processing apparatus, cause the data processing apparatus to perform the operations of the methods and their variations.

It will be appreciated that a wireless communication network may reconfigure its topology to improve network performance, such as to increase throughput or reduce latency between wireless nodes (or leaf nodes connected to the wireless nodes). Such reconfiguration may result in the wireless communication network having different topologies at different time frames. In some implementations, the data processing apparatus executes program instructions to determine a location of motion based on motion indicator values that are collected during different time frames, such as during a subsequent time frame and a prior time frame. The subsequent time frame and the prior time frame correspond to different topologies and may allow the data processing apparatus to determine the location of motion more accurately than if motion indicator values were used only from the subsequent time frame.

Figure 12A:
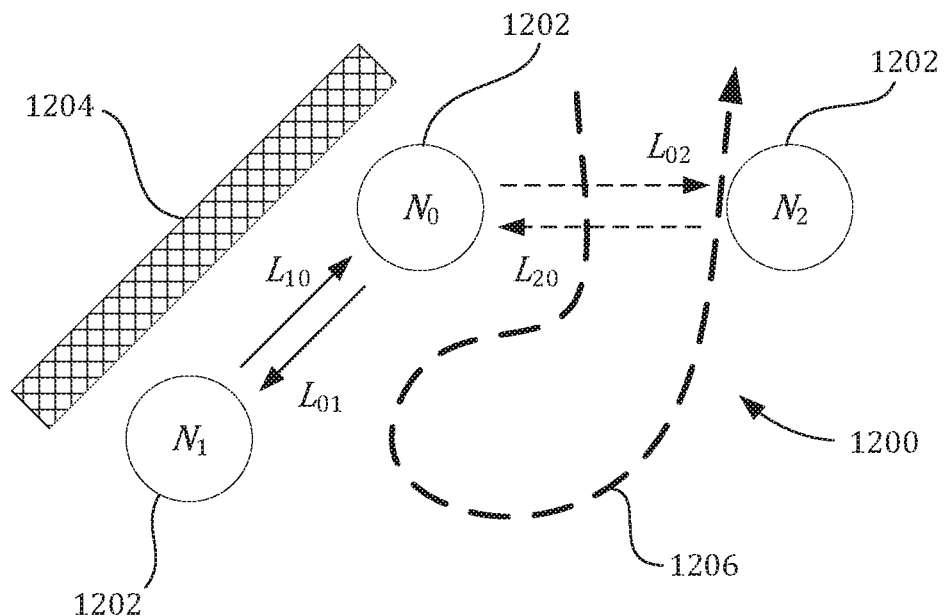
FIGS. 12A & 12B are a schematic diagrams of an example wireless communication network having different network topologies in, respectively, a subsequent time frame and a prior time frame.
Figure 12B:
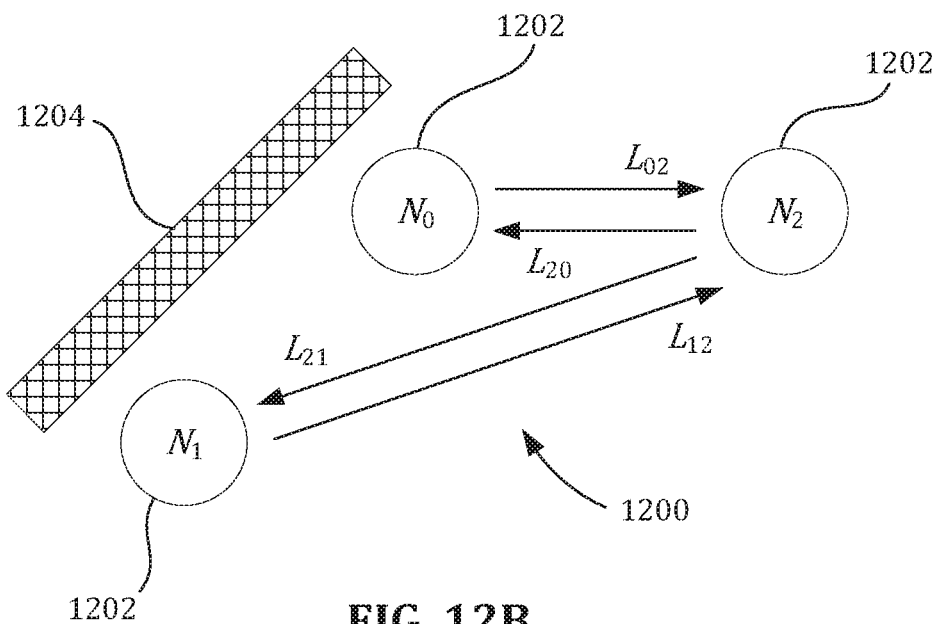

For example, FIGS. 12A & 12B present schematic diagrams of an example wireless communication network 1200 having different network topologies in, respectively, a subsequent time frame and a prior time frame. The example wireless communication network 1200 includes three wireless nodes 1202 labeled $N_0$, $N_1$, and $N_2$. Wireless nodes $N_0$ and $N_1$ are disposed adjacent a physical barrier 1204 (e.g., a wall) and wireless node $N_2$ is disposed a distance from the physical barrier 1204. A dashed arrow 1206 indicates motion of an object, which is predominantly located near wireless node $N_0$. The object is constrained from moving into a space between wireless nodes $N_0$ and $N_1$ by the physical barrier 1204. As such, wireless links $L_{01}$ and $L_{10}$ remain unexcited by the motion 1206 of the object. The data processing apparatus (or node tagger) is thus unable to establish a motion topology in which wireless node $N_0$ is doubly-connected. Instead, the motion topology is based on wireless links $L_{20}$ and $L_{02}$, and wireless nodes $N_0$ and $N_2$ are assigned with "tags" indicating their connected states as singly-connected. The resulting probability vector then inaccurately weights the location of motion equally between wireless nodes $N_0$ and $N_2$ despite the motion 1206 being predominantly located near wireless node $N_0$.

However, in the prior time frame, the example wireless communication network 1200 had a network topology in which wireless node $N_2$ was doubly-connected, as shown in FIG. 12B. Motion near wireless node $N_2$ would therefore excite four wireless links during this time frame (i.e., wireless links $L_{02}$, $L_{20}$, $L_{21}$, and $L_{12}$). The resulting motion topology determined would thus indicate, with high probability, a doubly-connected state for wireless node $N_2$. If motion occurred again near wireless node $N_2$ (but still with the network topology of FIG. 12B), motion indicator values from pairs of wireless links $L_{02}/L_{20}$ and $L_{21}/L_{12}$ could be collected and used to generate "deep tags" for each pair. The "deep tag" for wireless link pair $L_{02}/L_{20}$, in particular, could be referenced in the subsequent time frame to help resolve the location of motion between wireless nodes $N_0$ and $N_2$.

In some variations, the wireless communication network 1200 corresponds to a wireless mesh network and the wireless nodes $N_0$, $N_1$, and $N_2$ correspond to access point (AP) nodes of the wireless mesh network. The access point nodes may generate motion-sensing data based on wireless signals transmitted between respective pairs of the access point nodes, such as along wireless links $L_{01}$, $L_{10}$, $L_{02}$, $L_{20}$, $L_{12}$ and $L_{21}$. The motion-sensing data may be generated in response to motion of an object in a space traversed by the wireless signals (e.g., as indicated by dashed arrow 1206). However, the motion-sensing data may also be generated in the absence such motion.

Figure 13:
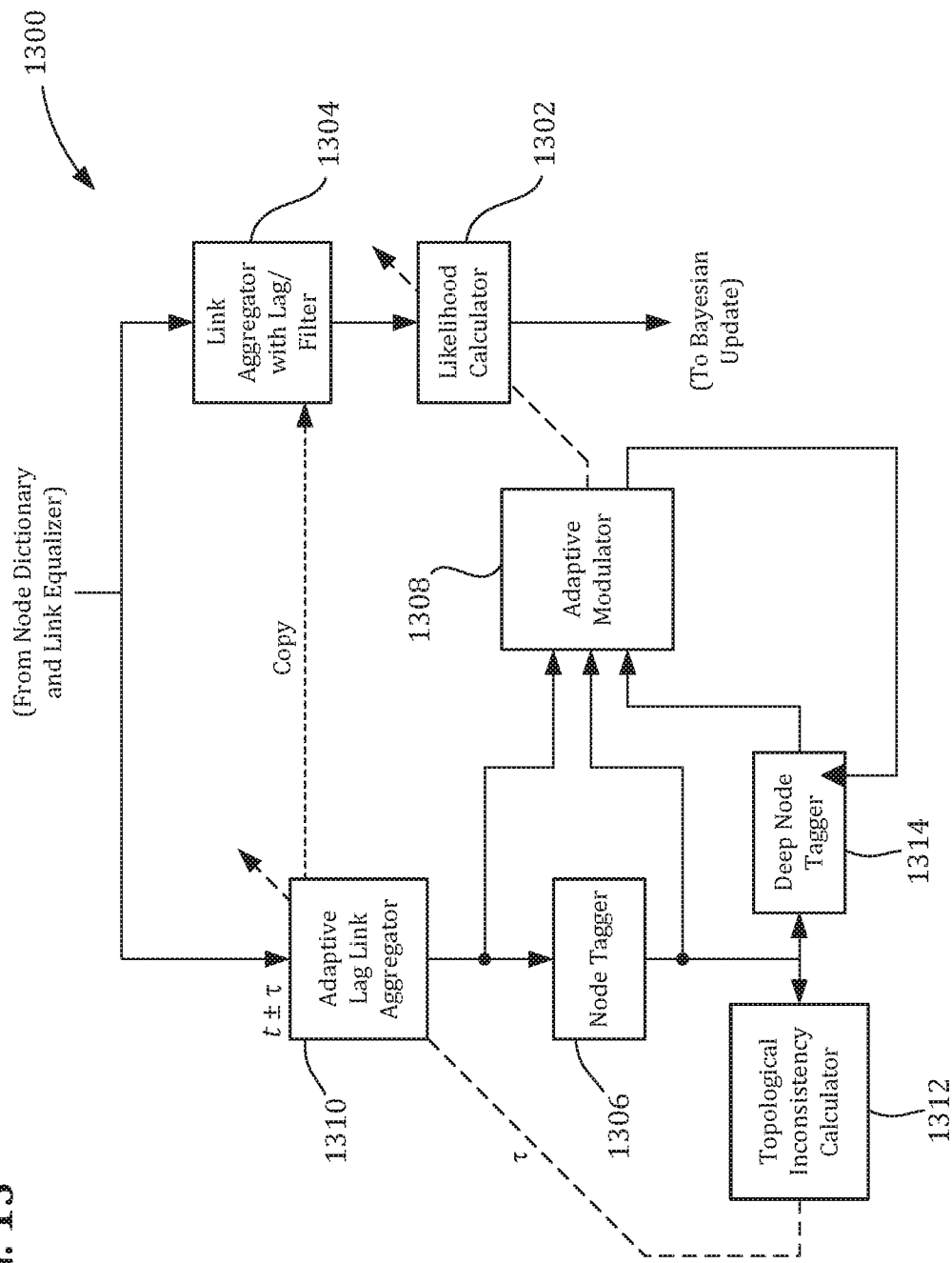
FIG. 13 is flowchart of an example process for determining a location of motion based on a prior topology of a wireless communication network.

FIG. 13 presents a flowchart 1300 of an example process for determining a location of motion based on a prior topology of a wireless communication network. The flowchart 1300 may represent an optional portion of the flowchart 400 described in relation to FIG. 4 and may correspond to program instructions to be executed by a data processing apparatus of a wireless communication network. At a start of the example process, the data processing apparatus may receive from a node dictionary (e.g., the node dictionary 408 of FIG. 4) a list of unique wireless nodes present in the wireless communication network during a time frame. The data processing apparatus may also receive from a link equalizer (e.g., the link equalizer 414 of FIG. 4) a list of wireless links identified as present in the wireless communication network during the time frame. The list of identified wireless links includes normalized motion indicator values for each wireless link. The list of unique wireless nodes and the list of identified wireless links may be stored in a database and used to define a network topology for the wireless communication network.

The flowchart 1300 includes features analogous to those already described in relation to the flowchart 1000 of FIG. 10. Features analogous to both FIG. 13 and FIG. 10 are related via coordinated numerals that differ in increment by two hundred. However, the flowchart 1300 includes additional features (or program instructions) that allow the data processing apparatus to determine the location of motion based on the prior topology. In particular, the data processing apparatus may execute program instructions to function, in part, as an adaptive modulator, as shown in block 1308. The adaptive modulator 1308 may function analogously to the adaptive modulator 1008 of FIG. 10, but also identifies a wireless node as stable when a probability value associated with its connected state is above a threshold probability. To do so, the adaptive modulator 1308 may query a "tag" database to retrieve a probability vector for all wireless nodes in the wireless communication network. The adaptive modulator 1308 also identifies wireless links associated with each stable wireless node. If all wireless links associated with a stable wireless node are being excited by motion, the adaptive modulator 1308 sends a first signal to a deep node tagger to sample motion indicator values from pairs of excited wireless links.

The data processing apparatus may also function in part as the deep node tagger, as shown in block 1314. In response to the first signal, the deep node tagger 1314 samples motion indicator values from pairs of excited wireless links associated with the stable wireless node. Each pair of excited wireless links defines a wireless communication channel between the stable wireless node and another wireless node, and all such pairs are sampled. The deep node tagger 1314 generates a probability density function (PDF) for each pair of excited wireless links from its respective sampled motion indicator values. The deep node tagger 1314 then compiles a "deep tag" that includes an identity of the stable wireless node, an identity of a pair of excited wireless links, and a respective probability density function. The "deep tag" may be stored in a "deep tag" database as a recorded "deep tag".

For example, and with reference to FIG. 12B, wireless node $N_2$ may be identified by the adaptive modulator 1308 as a stable wireless node with all associated wireless links being excited by motion. The adaptive modulator 1309 then sends a first signal to the deep node tagger 1314, which samples motion indicator values from the pairs of wireless links $L_{02}/L_{20}$ and $L_{21}/L_{12}$. The deep node tagger 1314 then generates two "deep tags", one for each pair of wireless links as shown below:

$$\{N_2; L_{02}, L_{20}; \text{PDF}(L_{02}, L_{20})\}$$

$$\{N_2; L_{21}, L_{12}; \text{PDF}(L_{21}, L_{12})\}$$

The two "deep tags" may subsequently be stored as recorded "deep tags" in in the "deep tag" database for future reference, such as during the subsequent time frame of FIG. 12A.

After the topology of the wireless communication network has changed, such as in a subsequent time frame, the adaptive modulator 1308 may identify a wireless node as inconsistent. In particular, the adaptive modulator 1308 may determine that a motion topology associated with the wireless node is persistently inconsistent with a network topology within a variable timeframe. Such persistent inconsistency may result from the topological inconsistency calculator 1312 increasing a duration of a variable timeframe to a maximum duration. The adaptive modulator 1308 then identifies a pair of wireless links associated with the inconsistent wireless node that is being excited by motion. The adaptive modulator 1308 also queries the "deep tag" dataset to find a recorded "deep tag" that references the identified pair of wireless links and a second wireless node different from the inconsistent wireless node (i.e., the pair of wireless links communicatively couple the inconsistent wireless node and the second wireless node). The adaptive modulator 1308 then sends a second signal to the deep node tagger 1314 to sample motion indicator values from the identified pair of wireless links.

In response to the second signal, the deep node tagger 1314 samples motion indicator values from the identified pair of wireless links and generates a corresponding probability density function. The deep node tagger 1314 then creates a "deep tag" associating the inconsistent wireless node with the identified pair of wireless links and corresponding probability density function. This "deep tag" serves as a test "deep tag" that is passed back to the adaptive modulator 1308.

After receiving the test "deep tag" from deep node tagger 1314, the adaptive modulator 1308 determines a distance between the probability density function of the recorded "deep tag" and the probability density function of the test "deep tag". For example, the adaptive modulator 1308 may compute a Kullback-Leibler divergence between the probability density functions to determine the distance. If the distance is less than or equal to a distance threshold, the adaptive modulator 1308 modifies a link likelihood map to include likelihood values biased towards the second wireless node. If the distance is greater than the distance threshold, the adaptive modulator 1308 modifies a link likelihood map to include likelihood values biased towards the inconsistent wireless node. The modified link likelihood map is then passed to the likelihood calculator 1302, which uses the modified link likelihood map to generate probability vectors for a Bayesian update engine (e.g., the Bayesian update engine 428 of FIG. 4).

In some implementations, a method for determining a location of motion includes storing first motion-sensing statistics derived from first motion-sensing data associated with a first time frame. The first motion-sensing statistics may include a "deep tag" that references an identity of a stable wireless node, pairs of excited wireless links defined in part by the stable wireless node, and respective probability density functions. Other statistics are possible. The first motion-sensing data is based on wireless signals transmitted between respective pairs of access point (AP) nodes in a wireless mesh network during the first time frame while the wireless mesh network operates in a first motion-sensing topology (or first motion topology). In some instances, the first motion-sensing data includes motion indicator values, which may be computed from channel information derived from the wireless signals. However, the first motion-sensing data may include other types of data, such as a list of unique wireless nodes during the first time frame and a list of wireless links identified as present in the wireless mesh network during the first time frame.

The method also includes obtaining second motion-sensing data based on wireless signals transmitted between respective pairs of the AP nodes during a second, subsequent time frame while the wireless network operates in a second, distinct motion-sensing topology (or second motion topology). The second motion-sensing statistics may include a test "deep tag" that references an identity of an inconsistent wireless node, pairs of excited wireless links defined in part by the inconsistent wireless node, and respective probability density functions. Other statistics are possible. The second motion-sensing data is based on wireless signals transmitted between respective pairs of AP nodes in the wireless mesh network during the second, subsequent time frame while the wireless mesh network operates in the second motion-sensing topology (or second motion topology). In some instances, the second motion-sensing data includes motion indicator values, which may be computed from channel information derived from the wireless signals. However, the second motion-sensing data may include other types of data, such as a list of unique wireless nodes during the second time frame and a list of wireless links identified as present in the wireless mesh network during the second time frame.

In in response to detecting an inconsistency associated with the second motion-sensing topology—e.g., an inconsistency between the second motion-sensing topology and a network topology of the wireless mesh network—the method includes obtaining second motion-sensing statistics derived from the second motion-sensing data and comparing the first motion-sensing statistics with the second motion-sensing statistics. The method additionally includes generating a probability vector based on the comparison. The probability vector includes values that represent probabilities of motion of an object at respective AP nodes during the second time frame. In many instances, generation of the probability occurs by operation of the data processing apparatus, which executes program instructions corresponding to one or more of the flowcharts depicted in FIGS. 4, 10, and 13. A location of the motion of the object during the second time frame is then determined based on the probability vector. In many implementations, the method includes repeating the operations, over multiple iterations for respective second time frames, of obtaining second motion-sensing data, detecting an inconsistency, generating a probability vector, and determining a location of motion.

In some implementations, the method includes identifying a set of wireless links in the wireless mesh network that were, according to the second motion-sensing data, excited by motion during the second time frame. The second motion-sensing statistics include test deep tags associated with the identified set of wireless links. Each test deep tag includes a respective test probability density function associated with the second time frame. The first motion-sensing statistics include reference deep tags associated with the identified set of wireless links. Each reference deep tag includes a respective reference probability density function associated with the first time frame. In these implementations, the method may include generating the test probability density functions based on sampling subsets of the first motion-sensing data and generating the reference probability density functions based on sampling subsets of the second motion-sensing data. In these implementations, the method may also include generating a count-value data structure that includes count values for respective AP nodes. Each count value indicates a number of wireless links defined by a respective AP node that were excited by motion during the second time period. The count-value data structure is then modified based on a comparison between the test deep tags and the reference deep tags, and the probability vector is generated based on the modified count-value data structure. In some instances, modifying the count-value data structure includes decreasing the count value for an AP node if a difference between the test deep tag and the reference deep tag is greater than a threshold difference. In some instances, modifying the count-value data structure includes increasing the count value for an AP node if a difference between the test deep tag and the reference deep tag is less than a threshold difference.

In some implementations, comparing the first motion-sensing statistics with the second motion-sensing statistics includes computing a Kullback-Leibler divergence between a test probability density function and a reference probability density function. In some implementations, the method includes identifying the first motion-sensing topology based on first tags assigned to respective AP nodes. Each of the first tags indicates a connected state of a respective AP node. In these implementations, the method also includes identifying the second motion-sensing topology based on second tags assigned to respective AP nodes. Each of the second tags indicates a connected state of a respective AP node.

In some implementations, detecting an inconsistency associated with the second motion-sensing topology includes detecting that the second-motion sensing topology does not match a network topology of the wireless mesh network during the second time frame. In some implementations, the wireless mesh network comprises one or more leaf nodes in addition to the AP nodes. In these implementations, determining the location of the motion includes identifying one of the AP nodes or one of the leaf nodes as the location of the motion.

The aforementioned methods and their variations may be implemented using a system that includes the wireless mesh network and its AP nodes (or leaf nodes, if present), one or more processors, and memory storing instructions that, when executed by the one or more processors, causes the system to perform operations of the methods and their variations. The aforementioned methods and their variations may also be stored as instructions on a non-transitory computer-readable medium. The instructions, when executed by a data processing apparatus, cause the data processing apparatus to perform the operations of the methods and their variations.

Figure 14:
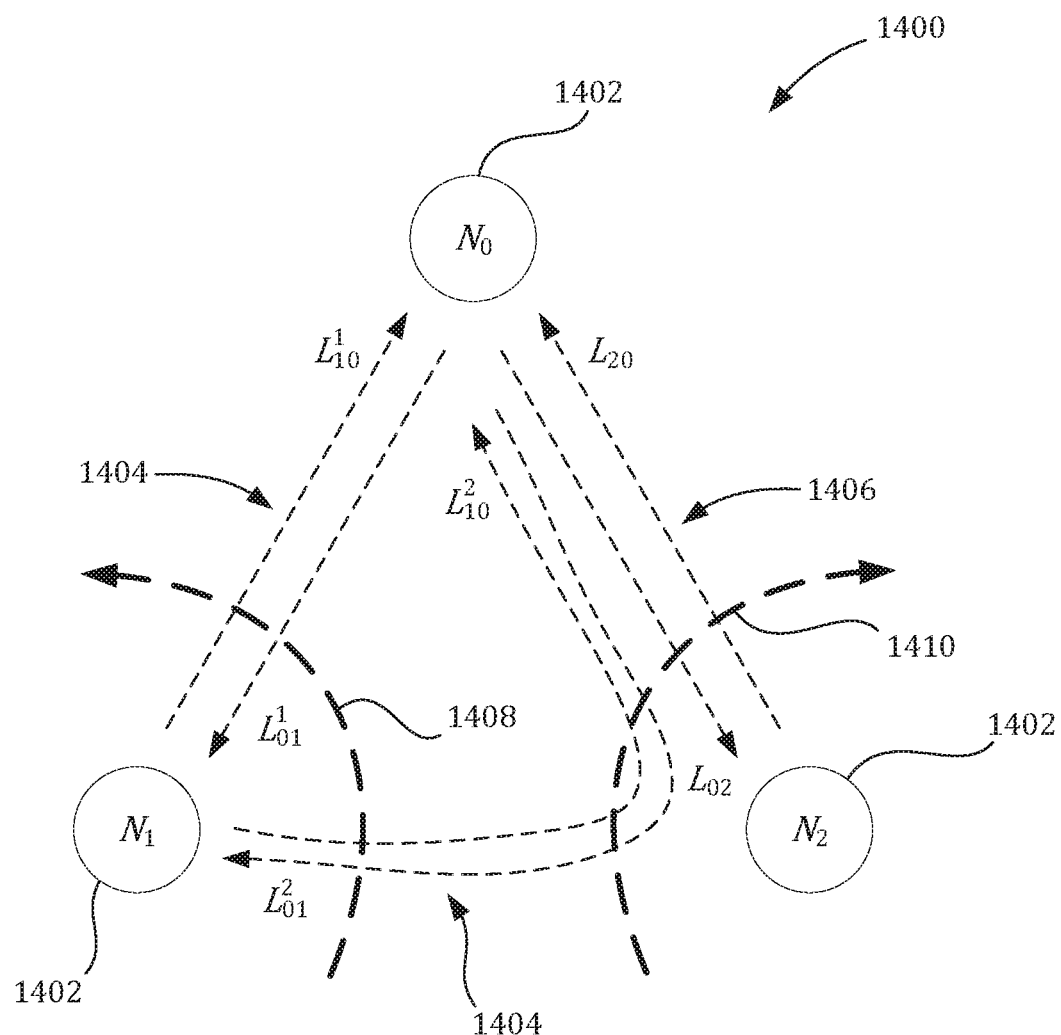
FIG. 14 is a schematic diagram is present of an example wireless communication network having a wireless communication channel with direct and indirect propagation pathways.

Now referring to FIG. 14, a schematic diagram is presented of an example wireless communication network 1400 having a wireless communication channel with direct and indirect propagation pathways. The example wireless communication network 1400 includes three wireless nodes 1402 labeled $N_0$, $N_1$, and $N_2$ that are connected in a star fashion. A network topology of the example wireless communication network 1400 includes a first wireless communication channel 1404 between wireless nodes $N_0$ and $N_1$ and a second wireless communication channel 1406 between wireless nodes $N_0$ and $N_2$. In the network topology, wireless node $N_0$ has a doubly-connected state and wireless nodes $N_1$ and $N_2$ each have singly connected states. However, the first communication channel 1404 is split into direct and indirect propagation paths. The direct propagation path more or less directly communicatively couples wireless nodes $N_0$ and $N_1$ and includes wireless links $L_{10}^1$ and $L_{01}^1$. The indirect propagation path communicatively couples wireless nodes $N_0$ and $N_1$ through a space adjacent wireless node $N_2$ and includes wireless links $L_{10}^2$ and $L_{01}^2$. The network topology of the example wireless communication network shown in FIG. 14 may result from an indoor environment that includes a reflector.

In situations where motion occurs near wireless node $N_1$, as shown by dashed arrow 1408, wireless links $L_{10}^1$ and $L_{01}^1$ will be excited substantially over wireless links $L_{10}^2$ and $L_{01}^2$. This excitation is conformant with the singly-connected state of wireless node $N_1$ in the network topology. However, in situations where motion occurs near wireless node $N_2$, as shown by dashed arrow 1410, wireless links $L_{10}^1$ and $L_{01}^1$ and wireless links $L_{10}^2$ and $L_{01}^2$ will both be excited. This excitation implies a doubly-connected state for wireless node $N_2$ that is not conformant to the singly-connected state of wireless node $N_2$ in the network topology. Moreover, due to the excitation, the motion topology of the example wireless communication network 1400 has more doubly-connected wireless nodes than the network topology.

In some variations, the wireless communication network 1400 corresponds to a wireless mesh network and the wireless nodes $N_0$, $N_1$, and $N_2$ correspond to access point (AP) nodes of the wireless mesh network. The access point nodes may generate motion-sensing data based on wireless signals transmitted between respective pairs of the access point nodes, such as along wireless links $L_{01}$, $L_{10}$, $L_{02}$, $L_{20}$, $L_{12}$ and $L_{21}$ of the wireless communication channels 1404, 1406. The motion-sensing data may be generated in response to motion of an object in a space traversed by the wireless signals (e.g., as indicated by dashed arrow 1408 or dashed arrow 1410). However, the motion-sensing data may also be generated in the absence such motion.

Figure 15:
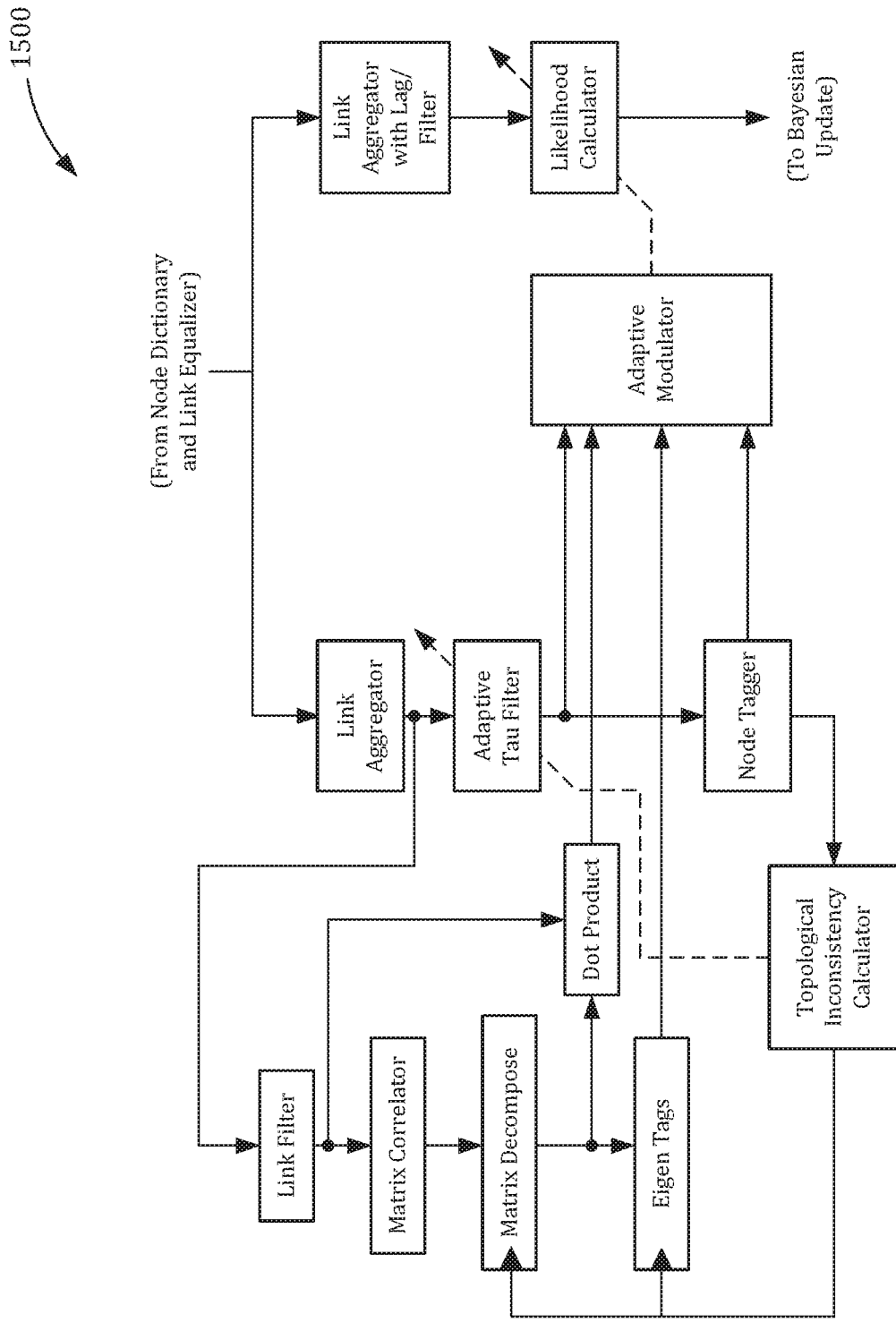
FIG. 15 is a flowchart of an example process for determining a location of motion based on a matrix decomposition of motion indicator values.

FIG. 15 presents a flowchart 1500 of an example process for determining a location of motion based on a matrix decomposition of motion indicator values. The flowchart 1500 may represent an optional portion of the flowchart 400 described in relation to FIG. 4 and may correspond to program instructions to be executed by a data processing apparatus of a wireless communication network. At a start of the example process, the data processing apparatus may receive from a node dictionary (e.g., the node dictionary 408 of FIG. 4) a list of unique wireless nodes present in the wireless communication network during a time frame. The data processing apparatus may also receive from a link equalizer (e.g., the link equalizer 414 of FIG. 4) a list of wireless links identified as present in the wireless communication network during the time frame. The list of identified wireless links includes normalized motion indicator values for each wireless link. The list of unique wireless nodes and the list of identified wireless links may be stored in a database and used to define a network topology for the wireless communication network.

The flowchart 1500 includes features analogous to those already described in relation to the flowchart 1000 of FIG. 10. Features analogous to both FIG. 15 and FIG. 10 are related via coordinated numerals that differ in increment by two hundred. However, the flowchart 1500 includes additional features (or program instructions) that allow the data processing apparatus to determine the location of motion based on the prior topology.

In parallel with the node tagger process path, the flowchart 1500 includes a second parallel process path. The second parallel process path is operable to distinguish between wireless nodes sharing a common connected state, such as the doubly-connected state of wireless nodes $N_0$ and $N_2$ in the motion topology shown by FIG. 14, and modify the likelihood function accordingly. The data processing apparatus may function in part as a link filter, which filters the wireless links associated with both of the doubly connected nodes. That is, the link filter selects those links, only when all four of them show excitation. Then it forms a correlation matrix from that link data.

In the present example, correlations within the correlation matrix come from two kinds of disturbances, a disturbance at wireless node $N_0$ and a disturbance at node $N_2$. These two disturbances get aggregated into the correlation matrix, and from a decomposition of the correlation matrix, two different flavors of the disturbances can be generated, e.g., two different orthogonal components of the correlation matrix.

The decomposition of the correlation matrix may help determine two unique kinds of vectors (of link excitation data) that can explain all the observed variation whenever the four links are triggered. The variation is aggregated by summing together the link vectors when they have four excited elements in them, then decompose the correlation matrix to find individual components creating that variation, and then projecting against those components to determine which component is the observed excitation closest to, and then assigning a likelihood based on that component's properties. The flowchart 1500 shows the process being done.

In second parallel process path, a matrix correlator takes the vector of four link excitation data, takes an outer product of it (e.g., to create a matrix), and sums it with the previous sum of outer products to create a running average of the correlation matrix. Then the correlation matrix is decomposed. This decomposition is triggered by the topological inconsistency calculator which now has two outputs instead of one. Previously, the topological inconsistency calculator was only triggering when the number of motion-connected nodes was less than the network connected nodes. But now it is also triggering in the opposite direction, for example, when it finds the number of motion-doubly-connected nodes to be higher than the network-doubly-connected nodes. When the topological inconsistency calculator determines that such a discrepancy exists, it then triggers the need to separate these wireless nodes based on something other than the motion-triggered wireless link behavior. At that instance, it triggers the matrix decomposition of the correlation matrix to happen, which leads to the formation of eigen components (or eigen vectors) of the matrix. The eigen components are then assigned tags, based on their special properties. The purpose of the tags is to assign one eigen component (or eigen vector) to wireless node $N_0$ and the other eigen component (or eigen vector) to wireless node $N_2$. Now when a new link excitation vector arrives carrying motion excitation on all four links, the data processing apparatus executes program instructions project the new link excitation vector (by computing the dot product) against both the component vectors. The likelihood is assigned on the basis of which dot product wins. The winning product's associated eigen-component-node is assigned a higher likelihood, and the loosing product's eigen-component-node is assigned a lower likelihood.

The formula below shows the matrix formation and the decomposition and the node assignment to eigen vectors:

$$\begin{bmatrix} N_0 \to N_1 \\ N_1 \to N_0 \\ N_0 \to N_2 \\ N_2 \to N_0 \end{bmatrix} = \begin{bmatrix} L_{01} \\ L_{10} \\ L_{02} \\ L_{20} \end{bmatrix} \sim \begin{bmatrix} x_1 \\ x_2 \\ x_3 \\ x_4 \end{bmatrix} + \begin{bmatrix} 0 \\ 0 \\ \delta_3 \\ \delta_4 \end{bmatrix} + \begin{bmatrix} \delta_1 \\ \delta_2 \\ 0 \\ 0 \end{bmatrix} \Bigg\} R_{xx} =$$

$$E(XX^T) \to SVD(R_{xx}) \to UAV$$

In the formula, the leftmost column presents the denomination of all the wireless links present in the example wireless communication network. When all these wireless links get triggered, the link filter operates to filter that signal and assign it a vector symbol x, which consists of four values as listed, i.e., $x_1$, $x_2$, $x_3$, and $x_4$. Such a vector on average may be composed of two components (over time). In some cases, wireless node $N_2$ generates such a vector. In some cases, wireless node $N_0$ generates such a vector. However, the properties of the vectors are slightly different. For example, when wireless node $N_2$ is triggered, wireless links $L_{02}$ and $L_{20}$ are triggered more than wireless links $L_{01}$ and $L_{10}$. This is because only a component of wireless links $L_{01}$ and $L_{10}$ passes through wireless node $N_2$. Most energy of that wireless link is passing through the other path which does not go through wireless node $N_2$. Hence excitation at wireless node $N_2$ does not create the same kind of perturbation as it creates in wireless links $L_{02}$ and $L_{20}$. This fact is shown by putting the +δ symbols in the place of two more excited wireless links $L_{02}$ and $L_{20}$. The purpose is not to show that the components are equal, but to demonstrate that, on average, they will be higher, when the excitation is coming wireless node $N_2$ (e.g., motion occurring near wireless node $N_2$), as opposed to excitation coming from wireless node $N_0$. In this way, the second parallel process path can distinguish how to assign the components.

The three right-most columns of the formula show the form and decomposition of the matrix, and x represents a column vector of link excitations. The column vector is multiplied by a transposed version of itself to create a matrix which is averaged, as shown by the expectation operator $E(XX^T)$. In some instances, the average value is subtracted from x before forming the outer product. Such subtraction may be necessary if x is a non-zero mean vector. Once matrix formation is done, a singular value decomposition (SVD) splits the matrix into its eigen-components, which can be extracted from the matrix U at its output. Each column of U contains one eigen-component. The first two columns of U are taken to look for two eigen-components. In the components, the data processing apparatus determines which link pair excitations are higher. If link pair excitations connected to wireless links $L_{02}$ and $L_{20}$ are higher, the vector is assigned to node wireless node $N_2$. A similar process can be applied to make an assignment based on the components of wireless links $L_{01}$ and $L_{10}$.

In this example, wireless node $N_2$ contends with wireless node $N_0$. Motion near wireless node $N_1$ will only excite two wireless links, hence wireless node $N_1$ will be classified as having singly-connected state in the motion topology and will have no incompatibility with the network topology. However, wireless nodes $N_0$ and $N_2$ need arbitration. Hence, the wireless links associated with wireless node $N_1$, i.e., wireless links $L_{01}$ and $L_{10}$, may be used to assign the eigen tags. Motion at wireless node $N_0$ will excite both the multipath components of wireless links $L_{01}$ and $L_{10}$ (as opposed to only one of them being excited with motion near wireless node $N_2$). Since both components are being excited, the magnitude of that excitation will be higher than the other two wireless link components in one of the eigen-components of the matrix. These higher valued $L_{01}$ and $L_{10}$ pair components should be assigned to node wireless node $N_0$, as described above. Once eigen assignment has happened, we are now ready. Each incoming link vector, if satisfying the excitation condition is projected on eigen components and a likelihood assigned (according to the table determined by a designer) based on the result of that projection.

In some implementations, a method for determining a location of motion includes storing a set of eigenvectors derived from first motion-sensing data associated with a first time frame. The first motion-sensing data is based on wireless signals transmitted between access point (AP) nodes in a wireless mesh network during the first time frame while the wireless mesh network operates in a first motion-sensing topology (or first motion topology). Each of the eigenvectors in the set is assigned to a respective one of the AP nodes. In some instances, the first motion-sensing data includes motion indicator values, which may be computed from channel information derived from the wireless signals. However, the first motion-sensing data may include other types of data, such as wireless nodes sharing a common connected state.

The method also includes obtaining a motion vector based on wireless signals transmitted between the AP nodes during a second, subsequent time frame while the wireless mesh network operates in a second, distinct motion-sensing topology. The motion vector includes motion indicator values for respective wireless links between the AP nodes. In response to detecting an inconsistency associated with the second motion-sensing topology, the motion vector is compared with the respective eigenvectors. The method additionally includes generating a probability vector based on the comparison. The probability vector includes values that represent probabilities of motion of an object at respective AP nodes during the second time frame. In many instances, generation of the probability occurs by operation of a data processing apparatus, which executes program instructions corresponding to one or more of the flowcharts depicted in FIGS. 4, 10, and 15. A location of the motion of the object during the second time frame is then determined based on the probability vector.

In some implementations, the method includes repeating the operations, over multiple iterations for respective second time frames, of obtaining a motion vector, comparing the motion vector, generating a probability vector, and determining a location of motion.

In some implementations, the method includes identifying the first motion-sensing topology based on first tags assigned to respective AP nodes. Each of the first tags indicates a connected state of a respective AP node. The method also includes identifying the second motion-sensing topology based on second tags assigned to respective AP nodes. Each of the second tags indicates a connected state of a respective AP node. In some implementations, detecting an inconsistency associated with the second motion-sensing topology includes detecting that the second-motion sensing topology does not match a network topology of the wireless mesh network during the second time frame. For example, detecting the inconsistency may include identifying a number of doubly-connected nodes in the motion-sensing topology that is greater than a number of doubly-connected nodes in the network topology.

In some implementations, the method includes generating the set of eigenvectors by at least obtaining an aggregate correlation matrix for the first time period based on the first motion-sensing data and performing a matrix decomposition of the aggregate correlation matrix to obtain the eigenvectors. In these implementations, the method may optionally include computing the aggregate correlation matrix by at least: [1] obtaining first motion vectors based on respective subsets of the first motion-sensing data, [2] for each of the subsets of the first motion-sensing data, multiplying the first motion vector by a transposed instance of the first motion vector to generate a correlation matrix, and [3] combining the correlation matrices for the subsets to obtain the aggregate correlation matrix. The first motion vectors each include first motion indicator values for respective wireless links between the AP nodes.

In some implementations, comparing the motion vector with the respective eigenvectors includes computing dot products between the motion vector and the respective eigenvectors. In these implementations, the probability vector is generated based on the dot products. In further implementations, the method includes generating a count-value data structure based on the motion-sensing data. The count-value data structure includes count values for respective AP nodes. Each count value indicates a number of wireless links defined by a respective AP node that were, according to the motion-sensing data, excited by motion. The method also includes modifying the count-value data structure based on the dot products and generating the probability vector based on the modified count-value data structure. In some variations, the dot products include first and second dot products in which the first dot product is computed from the respective eigenvector that is associated with a first AP node and the second dot product is computed from the respective eigenvector that is associated with a second AP node. The first dot product is higher than the second dot product. Moreover, modifying the count-value data structure includes increasing the count value for the first AP node and decreasing the count value for the second AP node.

In some implementations, the wireless mesh network includes one or more leaf nodes in addition to the AP nodes. In these implementations, determining the location of the motion includes identifying one of the AP nodes or one of the leaf nodes as the location of the motion.

The aforementioned methods and their variations may be implemented using a system that includes the wireless mesh network and its AP nodes (or leaf nodes, if present), one or more processors, and memory storing instructions that, when executed by the one or more processors, causes the system to perform operations of the methods and their variations. The aforementioned methods and their variations may also be stored as instructions on a non-transitory computer-readable medium. The instructions, when executed by a data processing apparatus, cause the data processing apparatus to perform the operations of the methods and their variations.

Figure 16:
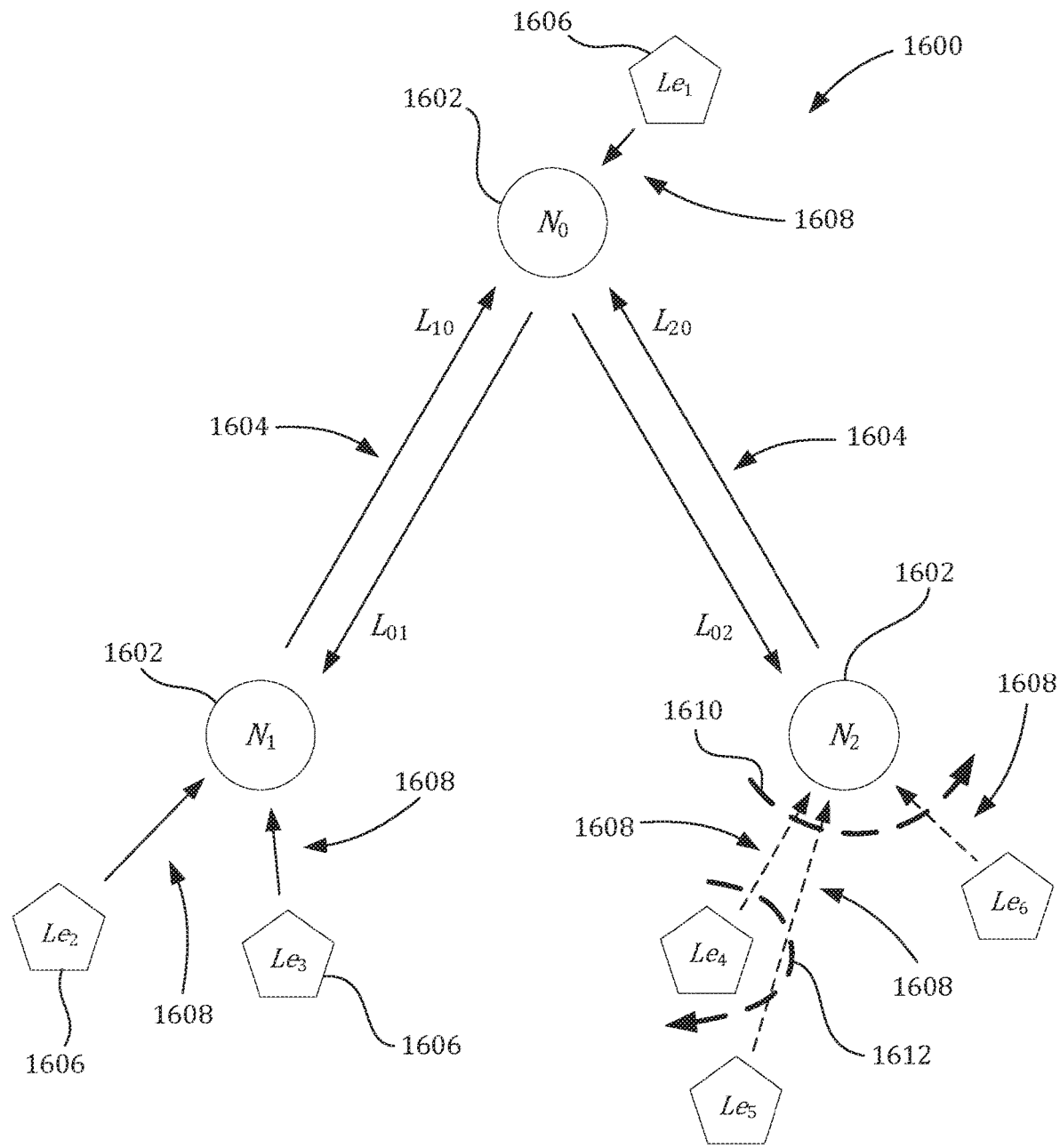
FIG. 16 is a schematic diagram is presented of an example wireless communication network in which leaf nodes are communicatively coupled to wireless nodes.

Now referring to FIG. 16, a schematic diagram is presented of an example wireless communication network 1600 in which leaf nodes 1606 are communicatively coupled to wireless nodes 1602. In particular, pairs of wireless nodes are communicatively coupled to each other via wireless communication channels 1604, and leaf nodes are communicatively coupled to wireless nodes via wireless communication channels 1608. Motion occurring near wireless node $N_2$, as indicated by dashed arrow 1610, will excite the wireless links communicatively coupling wireless node $N_2$ to leaf nodes $Le_4$, $Le_5$, and $Le_6$. However, if some of the leaf nodes 1606 are close to each other, motion near one of these close leaf nodes may excite wireless links associated with other close leaf nodes. In FIG. 16, leaf nodes $Le_4$ and $Le_5$ are shown close to each other. Motion around leaf node $Le_4$, as indicated by dashed arrow 1612, not only excites wireless links communicatively-coupling leaf node $Le_4$ to wireless node $N_2$, but also wireless nodes communicatively-coupling leaf node $Le_5$ to wireless node $N_2$.

In some variations, the wireless communication network 1600 corresponds to a wireless mesh network and the wireless nodes $N_0$, $N_1$, and $N_2$ correspond to access point (AP) nodes of the wireless mesh network. The access point nodes may generate motion-sensing data based on wireless signals transmitted along the wireless communication channels 1604, 1608. For example, the motion-sensing data may be based on wireless signals transmitted between respective pairs of the access point nodes along wireless links $L_{01}$, $L_{10}$, $L_{02}$, $L_{20}$, $L_{12}$ and $L_{21}$. The motion-sensing data may also be based on wireless signals transmitted from a leaf node to an access point node along wireless links defining the wireless communication channels 1608. The motion-sensing data may be generated in response to motion of an object in a space traversed by the wireless signals (e.g., as indicated by dashed arrow 1610 or dashed arrow 1612). However, the motion-sensing data may also be generated in the absence of such motion.

Figure 17:
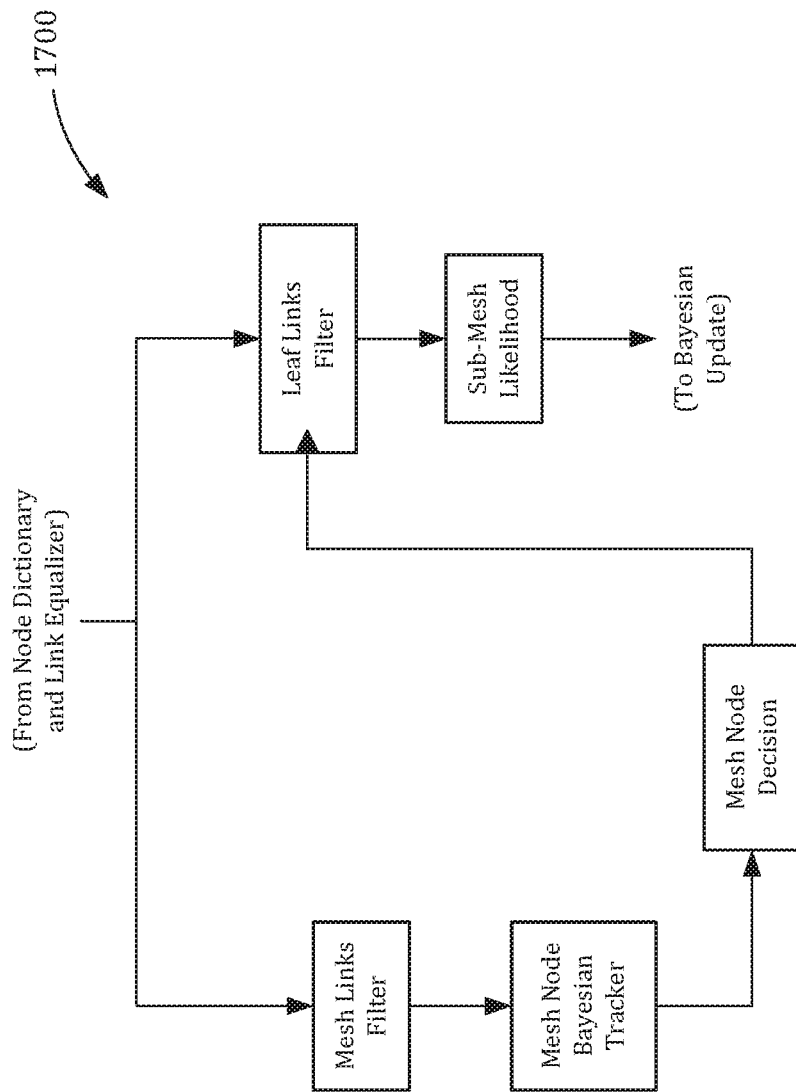
FIG. 17 is a flowchart of an example process for determining a location of motion based on identifying a wireless node near the motion and then identifying a leaf node communicatively coupled to the wireless node.

FIG. 17 presents a flowchart 1700 of an example process for determining a location of motion based on identifying a wireless node near the motion and then identifying a leaf node communicatively coupled to the wireless node. The example process may localize the motion to both the wireless node and the leaf node. Wireless nodes may have higher powers than leaf nodes, and as such, may be more prone to multipath effects as discussed in relation to FIG. 14. As such, the example process localizes the motion to a wireless node first to mitigate possible multipath effects and improve an accuracy of motion detection. A data processing apparatus executing program instructions according to the example process may continuously generate the best wireless node estimate from the available excited wireless link data. This estimate is used to form a decision on the wireless node that the motion disturbance is closest to. Once the wireless node decision is formed, the decision is used to filter out some of the leaf node wireless links that are connected to the other wireless nodes. Such filtering allows some of the lowest likelihoods to be assigned those leaf nodes. Once the appropriate leaf-node wireless links have been filtered, the remaining wireless links are passed to the sub-mesh likelihood function. Using the sub-mesh likelihood function, the data processing apparatus calculates the likelihood of whether the motion is close to a wireless node, or any of the leaf nodes connected to the wireless node. This calculation allows the motion to be precisely located as happening close to any of the available nodes in the wireless communication network (e.g., a wireless node or a leaf node).

FIG. 18 presents an example formula for determining a location of motion using a sub-mesh likelihood function. The sub-mesh nodes undergo a separate likelihood formation, than the nodes excluded from the sub-mesh. The excluded nodes are assigned a uniformly (very) small weight. In the specific example of motion in FIG. 16, a sub-mesh would be defined by wireless node $N_2$ and leaf nodes $Le_4$, $Le_5$, and $Le_6$. The sub-mesh likelihood function is operable to resolve: [1] competition between a wireless node and a leaf node, and [2] competition amongst several leaf nodes whose respective wireless links may have been triggered due to motion. The sub-mesh likelihood function resolves the competition between a wireless node and a leaf node because, if data processing apparatus simply counts the number of times that any node has appeared in the excited wireless links, then appearance of a wireless node will always surpass the leaf nodes whenever any two wireless links connected to the wireless node are triggered. However, this appearance can be artificial. For example, two leaf-node wireless links could be triggered because of the close proximity of the leaf nodes, and motion could be happening at any one of the two leaf nodes. A more accurate measure of motion at the wireless node is whether all wireless links connected to it have been excited or not. If the motion is actually happening at the wireless node, then all wireless links connected to the node (i.e., leaf nodes) will show some disturbance, as the channel present in those wireless links is undergoing changes. This behavior rectified by modifying the likelihood function to include the proportion shown below:

$$\frac{\text{number of appearances in active links}}{\text{connectivity of the node}}$$

This proportion—which is also shown in FIG. 18—allows the likelihood of wireless node to reach one (highest) only when all the connected wireless links show motion on them. Since the leaf node has a connectivity of one (always), the proportion will rise quickly to one whenever any of the leaf-node wireless links are triggered.

If two leaf-node wireless links are simultaneously triggered due to the close proximity of the leaf nodes, the likelihood function can be further modified to account for this scenario. In particular, the motion magnitude of the leaf nodes can be ordered. The highest magnitude can be given a rank or 1, the next highest magnitude 2, and so forth. Then, a multiplier variable (a) can be selected that is a number less than one, and specifies how much weight should be given to the motion rank information in order to determine a likelihood. The value of the multiplier variable may be selected to have a small value with a range from 0.01 to 0.09. The multiplier variable serves to amplify or de-amplify the motion rank information in the computation of the likelihood. For a leaf node showing the highest rank, the likelihood expression above would be modified by multiplication with the term $(1-\alpha \times \text{rank})$. If the rank is one, then a would be subtracted from one to create a relatively large weight. If the rank is 2, then 2a would be subtracted from one to create a smaller weight for that leaf node's likelihood. In this manner, a likelihood is assigned to all leaf nodes whose respective wireless links have shown motion excitation on them. Such assignment allows the motion intensity (or channel disturbance) present on each leaf-node wireless link to be accounted for in the likelihood of motion, and eventually in the probability of motion at that particular node.

In some implementations, a method for determining a location of motion includes obtaining motion-sensing data based on wireless signals exchanged on wireless links in a wireless mesh network comprising a plurality of nodes. The plurality of nodes includes a first access point (AP) node, one or more other AP nodes, and leaf nodes. The wireless links includes wireless links between the first AP node and the one or more other AP nodes as well as wireless links between the first AP node and a first subset of the leaf nodes. The method also includes identifying, based on the motion-sensing data, the first AP node as an estimated location of motion of an object.

In response to the first AP node being identified as the estimated location of motion, the method additionally includes generating a likelihood data structure including likelihood values assigned to respective nodes of the plurality of nodes. The likelihood values are assigned to the first subset of the leaf nodes and the first AP node being higher than the likelihood values assigned to other nodes in the wireless mesh network. In some variations, the likelihood values assigned to the first subset of the leaf nodes and the first AP node are at least an order of magnitude higher than the likelihood values assigned to other nodes in the wireless mesh network. A location of the motion of the object is determined based on the likelihood data structure. In some implementations, the method includes repeating the operations, over multiple iterations for respective time frames, of obtaining motion-sensing data, identifying a first AP node, generating a likelihood data structure, and determining a location of the motion.

In some implementations, determining the location of the motion of the object includes generating a probability vector based on the likelihood data structure. The probability vector includes probability values that represent probabilities of motion at respective nodes of the wireless mesh network. Determining the location of the motion of the object also includes selecting, based on the probability vector, the first AP node or one of the first subset of leaf nodes as the location of the motion.

In some implementations, the method includes computing the likelihood value assigned to the first AP node based on a ratio of a number of leaf nodes in the first subset and a number representing a connected state of the first AP node. In further implementations, the method includes computing the likelihood values assigned to the first subset of leaf nodes based on ranking motion indicator values associated with the wireless links between the first AP node and the first subset of leaf nodes. In some instances, the likelihood value assigned to each respective leaf node represents the product of a rank assigned to the leaf node multiplied by an amplification factor. In these instances, the method may optionally include assigning a uniform value to the other nodes in the wireless mesh network.

The aforementioned methods and their variations may be implemented using a system that includes the wireless mesh network and its AP and leaf nodes, one or more processors, and memory storing instructions that, when executed by the one or more processors, causes the system to perform operations of the methods and their variations. The aforementioned methods and their variations may also be stored as instructions on a non-transitory computer-readable medium. The instructions, when executed by a data processing apparatus, cause the data processing apparatus to perform the operations of the methods and their variations.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

Some of the operations described in this specification can be implemented as operations performed by a data processing apparatus on data stored on one or more computer-readable storage devices or received from other sources.

The term "data-processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, program instructions, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory or both. Elements of a computer can include a processor that performs actions in accordance with instructions, and one or more memory devices that store the instructions and data. A computer may also include, or be operatively coupled to receive data from or transfer data to, or both, one or more mass storage devices for storing data, e.g., magnetic disks, magneto optical disks, or optical disks. However, a computer need not have such devices. Moreover, a computer can be embedded in another device, e.g., a phone, an electronic appliance, a mobile audio or video player, a game console, a Global Positioning System (GPS) receiver, or a portable storage device (e.g., a universal serial bus (USB) flash drive). Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A method comprising:
   obtaining motion-sensing data based on wireless signals exchanged on wireless links in a wireless mesh network comprising a plurality of nodes, the nodes of the wireless mesh network comprising a first access point (AP) node, one or more other AP nodes and leaf nodes, the wireless links comprising:
   wireless links between the first AP node and the one or more other AP nodes, and
   wireless links between the first AP node and a first subset of the leaf nodes;
   identifying, based on the motion-sensing data, the first AP node as an estimated location of motion of an object;
   in response to the first AP node being identified as the estimated location of motion, generating a likelihood data structure comprising likelihood values assigned to respective nodes of the plurality of nodes, the likelihood values assigned to the first subset of the leaf nodes and the first AP node being higher than the likelihood values assigned to other nodes in the wireless mesh network;
   determining a location of the motion of the object based on the likelihood data structure.

2. The method of claim 1, wherein determining the location of the motion of the object comprises:
   generating a probability vector based on the likelihood data structure, the probability vector comprising probability values that represent probabilities of motion at respective nodes of the wireless mesh network; and
   selecting, based on the probability vector, the first AP node or one of the first subset of leaf nodes as the location of the motion.

3. The method of claim 1, comprising computing the likelihood value assigned to the first AP node based on a ratio of:
   a number of leaf nodes in the first subset; and
   a number representing a connected state of the first AP node.

4. The method of claim 3, comprising computing the likelihood values assigned to the first subset of leaf nodes based on ranking motion indicator values associated with the wireless links between the first AP node and the first subset of leaf nodes.

5. The method of claim 4, wherein the likelihood value assigned to each respective leaf node represents the product of a rank assigned to the leaf node multiplied by an amplification factor.

6. The method of claim 5, comprising assigning a uniform value to the other nodes in the wireless mesh network.

7. The method of claim 1, wherein the likelihood values assigned to the first subset of the leaf nodes and the first AP node are at least an order of magnitude higher than the likelihood values assigned to other nodes in the wireless mesh network.

8. The method of claim 1, comprising:
   repeating the operations, over multiple iterations for respective time frames, of obtaining motion-sensing data, identifying a first AP node, generating a likelihood data structure, and determining a location of the motion.

9. A system comprising:
   a wireless mesh network comprising nodes connected by wireless links, the nodes of the wireless mesh network comprising a first access point (AP) node, one or more other AP nodes and leaf nodes, the wireless links comprising:
   wireless links between the first AP node and the one or more other AP nodes; and
   wireless links between the first AP node and a first subset of the leaf nodes;
   one or more processors; and
   memory storing instructions, wherein the one or more processors are configured to execute the instructions to perform operations comprising:
   obtaining motion-sensing data based on wireless signals exchanged on the wireless links;
   identifying, based on the motion-sensing data, the first AP node as an estimated location of motion of an object;
   in response to the first AP node being identified as the estimated location of motion, generating a likelihood data structure comprising likelihood values assigned to respective nodes of the plurality of nodes, the likelihood values assigned to the first subset of the leaf nodes and the first AP node being higher than the likelihood values assigned to other nodes in the wireless mesh network;
   determining a location of the motion of the object based on the likelihood data structure.

10. The system of claim 9, wherein determining the location of the motion of the object comprises:
  generating a probability vector based on the likelihood data structure, the probability vector comprising probability values that represent probabilities of motion at respective nodes of the wireless mesh network; and
  selecting, based on the probability vector, the first AP node or one of the first subset of leaf nodes as the location of the motion.

11. The system of claim 9, wherein the operations comprise computing the likelihood value assigned to the first AP node based on a ratio of:
  a number of leaf nodes in the first subset; and
  a number representing a connected state of the first AP node.

12. The system of claim 11, wherein the operations comprise computing the likelihood values assigned to the first subset of leaf nodes based on ranking motion indicator values associated with the wireless links between the first AP node and the first subset of leaf nodes.

13. The system of claim 12, wherein the likelihood value assigned to each respective leaf node represents the product of a rank assigned to the leaf node multiplied by an amplification factor.

14. The system of claim 13, wherein the operations comprise assigning a uniform value to the other nodes in the wireless mesh network.

15. The system of claim 9, wherein the likelihood values assigned to the first subset of the leaf nodes and the first AP node are at least an order of magnitude higher than the likelihood values assigned to other nodes in the wireless mesh network.

16. The system of claim 9, wherein the operations comprise:
  repeating the operations, over multiple iterations for respective time frames, of obtaining motion-sensing data, identifying a first AP node, generating a likelihood data structure, and determining a location of the motion.

17. A non-transitory computer-readable medium storing instructions that, when executed by a data processing apparatus, cause the data processing apparatus to perform operations comprising:
  obtaining motion-sensing data based on wireless signals exchanged on wireless links in a wireless mesh network comprising a plurality of nodes, the nodes of the wireless mesh network comprising a first access point (AP) node, one or more other AP nodes and leaf nodes, the wireless links comprising:
    wireless links between the first AP node and the one or more other AP nodes, and
    wireless links between the first AP node and a first subset of the leaf nodes;
  identifying, based on the motion-sensing data, the first AP node as an estimated location of motion of an object;
  in response to the first AP node being identified as the estimated location of motion, generating a likelihood data structure comprising likelihood values assigned to respective nodes of the plurality of nodes, the likelihood values assigned to the first subset of the leaf nodes and the first AP node being higher than the likelihood values assigned to other nodes in the wireless mesh network;
  determining a location of the motion of the object based on the likelihood data structure.

18. The non-transitory computer-readable medium of claim 17, wherein determining the location of the motion of the object comprises:
  generating a probability vector based on the likelihood data structure, the probability vector comprising probability values that represent probabilities of motion at respective nodes of the wireless mesh network; and
  selecting, based on the probability vector, the first AP node or one of the first subset of leaf nodes as the location of the motion.

19. The non-transitory computer-readable medium of claim 17, wherein the operations comprise computing the likelihood value assigned to the first AP node based on a ratio of:
  a number of leaf nodes in the first subset; and
  a number representing a connected state of the first AP node.

20. The non-transitory computer-readable medium of claim 19, wherein the operations comprise computing the likelihood values assigned to the first subset of leaf nodes based on ranking motion indicator values associated with the wireless links between the first AP node and the first subset of leaf nodes.

21. The non-transitory computer-readable medium of claim 20, wherein the likelihood value assigned to each respective leaf node represents the product of a rank assigned to the leaf node multiplied by an amplification factor.

22. The non-transitory computer-readable medium of claim 21, wherein the operations comprise assigning a uniform value to the other nodes in the wireless mesh network.

23. The non-transitory computer-readable medium of claim 17, wherein the likelihood values assigned to the first subset of the leaf nodes and the first AP node are at least an order of magnitude higher than the likelihood values assigned to other nodes in the wireless mesh network.

24. The non-transitory computer-readable medium of claim 17, wherein the operations comprise:
  repeating the operations, over multiple iterations for respective time frames, of obtaining motion-sensing data, identifying a first AP node, generating a likelihood data structure, and determining a location of the motion.

* * * * *